US012678782B2

(12) United States Patent
Schmidt et al.

(10) Patent No.: US 12,678,782 B2
(45) Date of Patent: Jul. 14, 2026

(54) HAND-HELD PIPETTING DEVICE

(71) Applicant: EPPENDORF SE, Hamburg (DE)

(72) Inventors: Alisa Schmidt, Hamburg (DE);
Kathlen Jost, Hamburg (DE); **Negar
Rajabi, Hamburg (DE); Jan Eckhoff**,
Hamburg (DE); Johannes Egger,
Munich (DE)

(73) Assignee: Eppendorf SE (DE)

( * ) Notice: Subject to any disclaimer, the term of this
patent is extended or adjusted under 35
U.S.C. 154(b) by 143 days.

(21) Appl. No.: 18/261,952

(22) PCT Filed: Jan. 24, 2022

(86) PCT No.: PCT/EP2022/051501
§ 371 (c)(1),
(2) Date: Jul. 18, 2023

(87) PCT Pub. No.: WO2022/157364
PCT Pub. Date: Jul. 28, 2022

(65) Prior Publication Data
US 2024/0075469 A1      Mar. 7, 2024

(30) Foreign Application Priority Data
Jan. 25, 2021   (EP) ..................................... 21153268

(51) Int. Cl.
*B01L 3/02*          (2006.01)
*G06F 3/04847*      (2022.01)

(52) U.S. Cl.
CPC ........ *B01L 3/0237* (2013.01); *G06F 3/04847*
(2013.01); *B01L 3/0286* (2013.01); *B01L
2300/023* (2013.01); *B01L 2300/027* (2013.01)

(58) Field of Classification Search
CPC ................ B01L 3/0237; B01L 3/0286; B01L
2300/023; B01L 2300/027;
(Continued)

(56) References Cited

U.S. PATENT DOCUMENTS

| 2012/0291567 A1* | 11/2012 | Homberg | .............. | B01L 3/0237 |
| | | | | 73/864.13 |
| 2013/0288382 A1* | 10/2013 | Andres | ................. | B01L 3/0237 |
| | | | | 436/180 |
| 2015/0000429 A1* | 1/2015 | Lind | ..................... | B01L 3/0237 |
| | | | | 73/864.13 |

FOREIGN PATENT DOCUMENTS

| EP | 2641656 A1 | 9/2013 |
| EP | 2814612 B1 | 1/2019 |

(Continued)

OTHER PUBLICATIONS

International Search Report and Written Opinion dated Mar. 25,
2022 issued in international patent application No. PCT/EP2022/
051501.

(Continued)

*Primary Examiner* — Benjamin R Schmitt
(74) *Attorney, Agent, or Firm* — Dorsey & Whitney LLP

(57) ABSTRACT
The invention relates to a pipetting device with a touch
screen and a system comprising said pipetting device. The
operating concept of this pipetting device provides that
values of pipetting parameters can be set by a user on at least
one input screen page, that actuation of the actuating ele-
ment leads to the display of an output screen page and to the
start of a pipetting operation defined according to the
pipetting parameters, and that touching a separate input field
of the output screen page leads back to an input screen page.

15 Claims, 15 Drawing Sheets

Figures 1A, 1B:
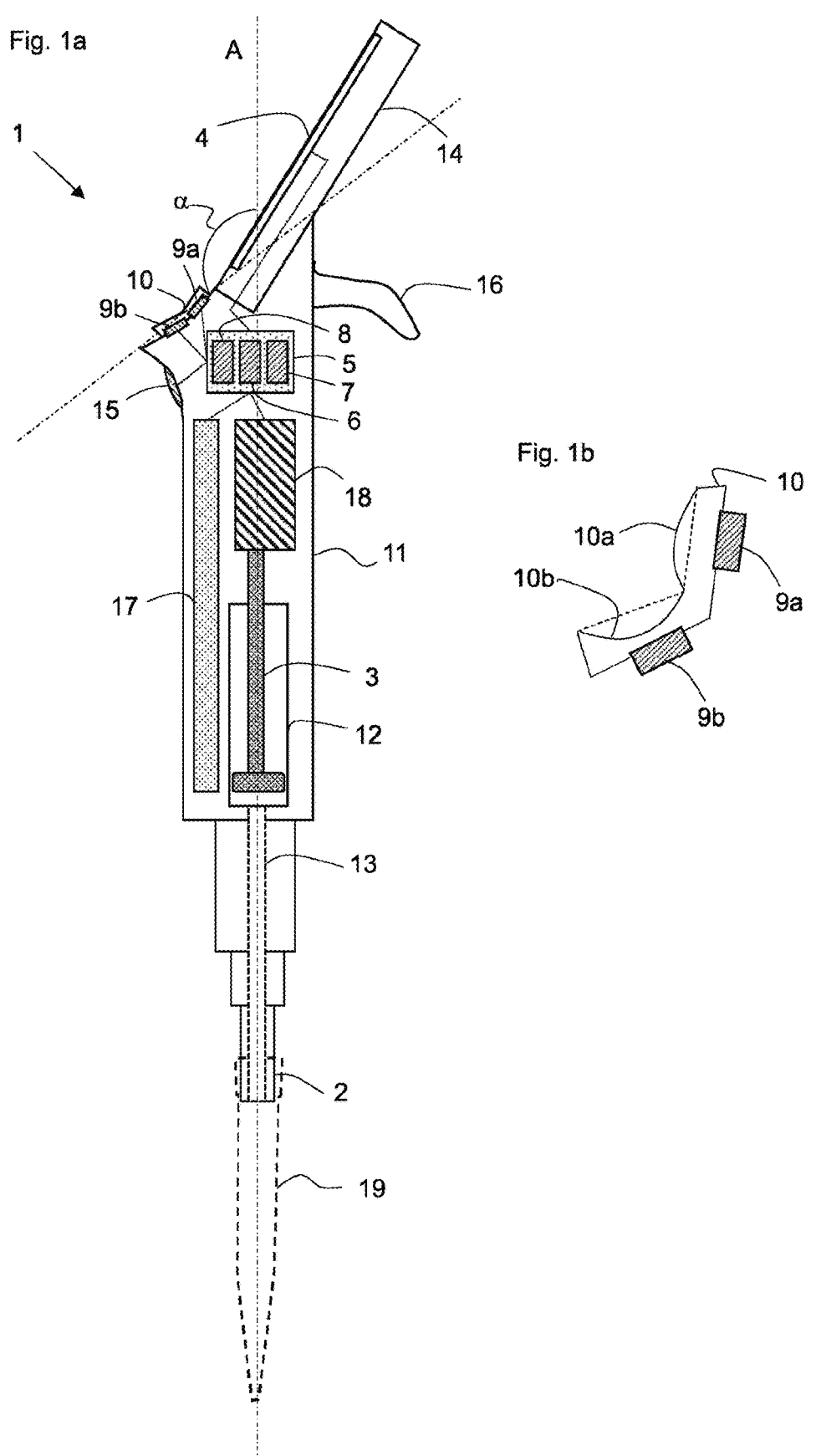

(58) Field of Classification Search
CPC ... G01N 35/00584; G01N 2035/00891; G01N
2035/0091; G06F 3/048; G06F 3/0484;
G06F 3/04847
See application file for complete search history.

(56) References Cited

FOREIGN PATENT DOCUMENTS

| | | |
|---|---|---|
| JP | 2013195431 A | 9/2013 |
| JP | 2017505714 A | 2/2017 |

OTHER PUBLICATIONS

European Search Report dated Jul. 8, 2021 issued in European
patent application No. 21153268.4.

* cited by examiner

Fig. 1c
Fig. 1d
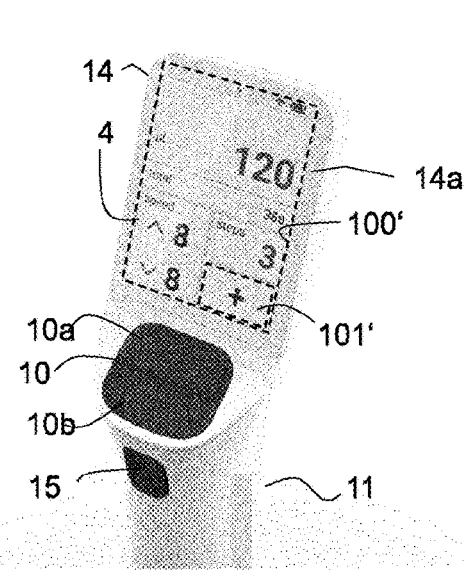
Fig. 1e
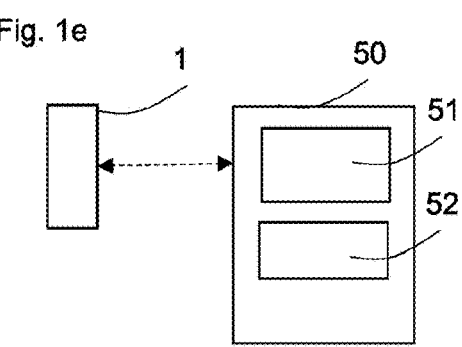

Fig. 2b    Multidispense
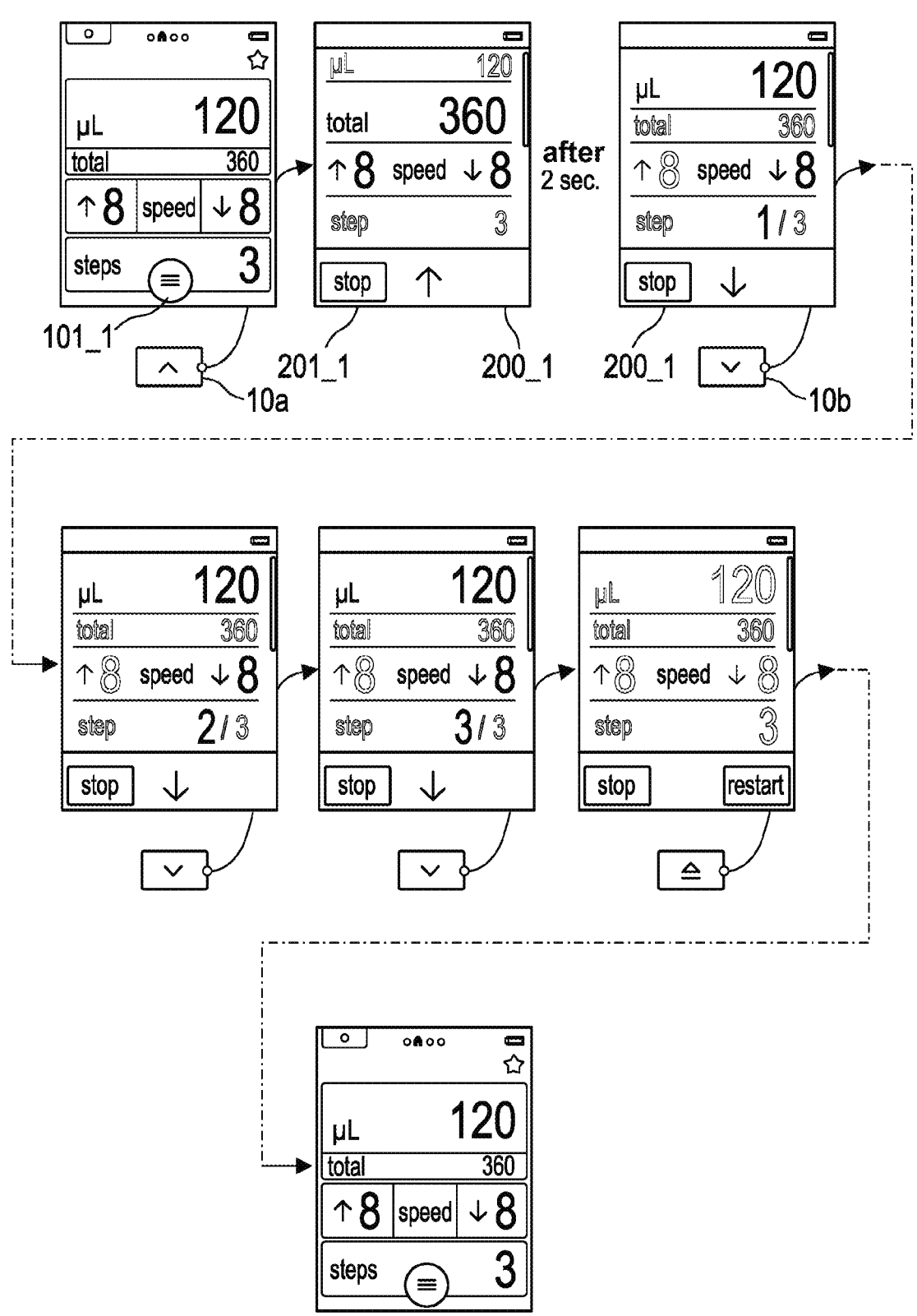

Tags

Selection of parameters

Scrollable
List

B

Fig. 5b
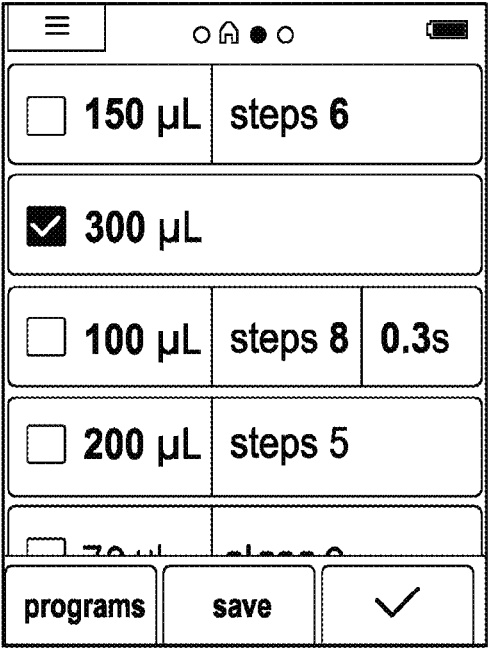
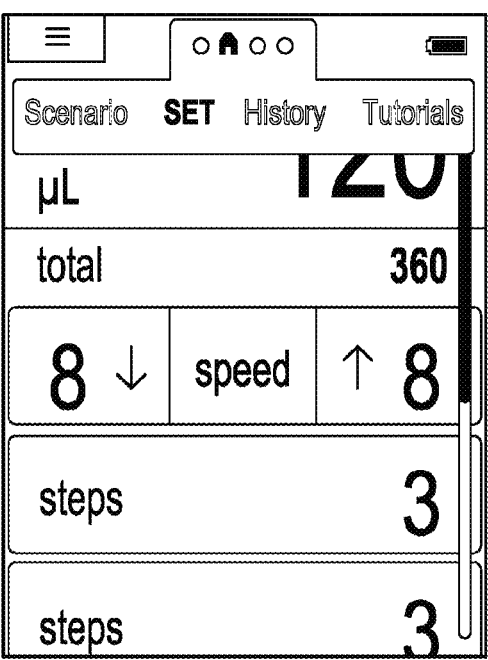

Fig. 6
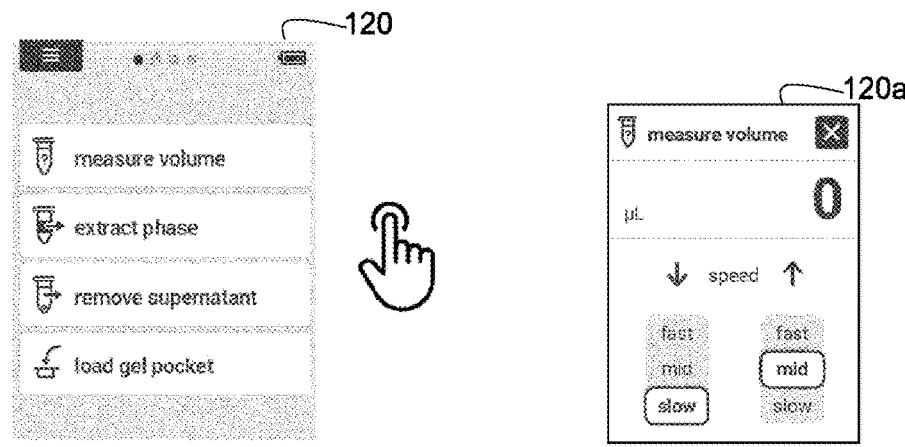
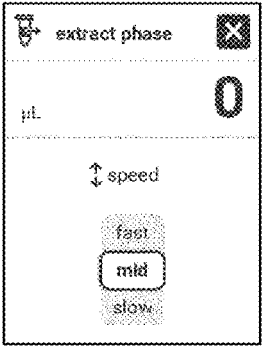
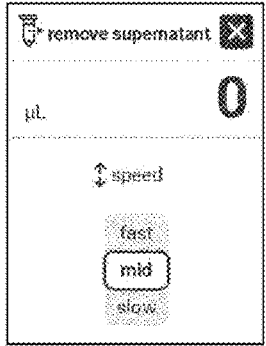
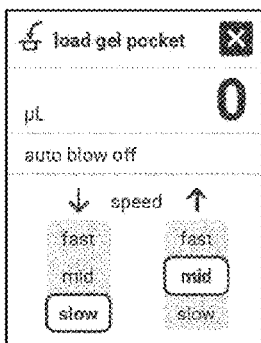
Fig. 7a                                                Fig. 7b
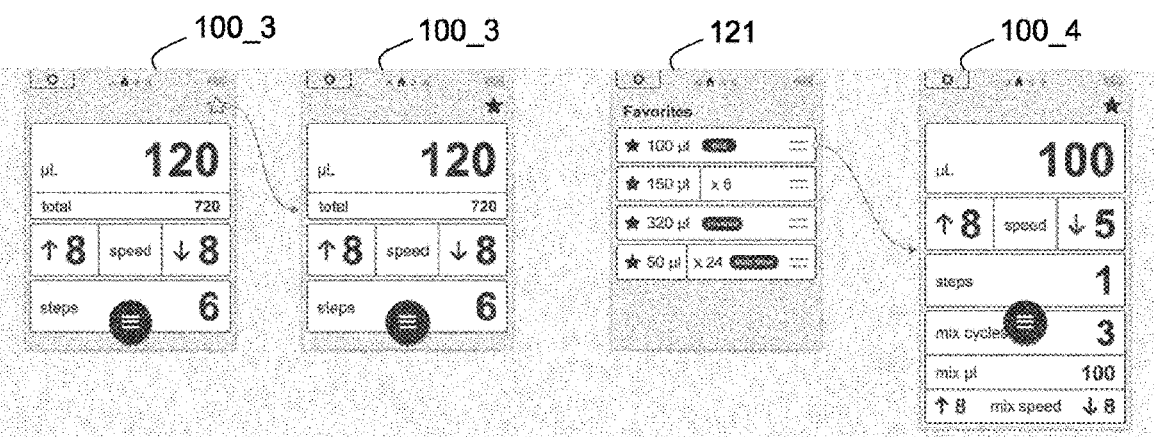

1

HAND-HELD PIPETTING DEVICE

This patent application is a U.S. National Stage filing under 35 U.S.C. 371 of International Patent Application No. PCT/EP2022/051501, titled "HAND-HELD PIPETTING DEVICE," filed Jan. 24, 2022, which claims priority to European Patent Application No. 21153268.4, filed Jan. 25, 2021, each of which is incorporated herein by reference in its entirety.

The invention relates to a hand-held pipetting device, a system for exchanging data between said hand-held pipetting device and an external device, and computer program code executable by said hand-held pipetting device.

Such hand-held pipetting device are commonly used in medical, biological, biochemical, chemical and other laboratories. They are used in the laboratory for transporting and transferring fluid samples with small volumes, especially for precise dispensing of samples. Two known classes of such hand-held pipetting devices differ in the respective physical principle of fluid aspiration or dispensing. Either the liquid is dispensed by the air cushion principle or the direct displacement principle is used. The first class of devices is called air cushion pipettes, the second class is called direct displacement pipettes.

Air cushion pipettes use a piston-cylinder system with which the actual measurement takes place. An air cushion separates the sample aspirated into a plastic tip from the piston inside the pipette. As the piston slides up, a vacuum is created in the tip, causing the liquid to rise into the tip. The air cushion moved by the piston acts like an elastic spring from which the volume of liquid in the tip hangs. In hand-held pipetting devices that operate according to the direct displacement principle, tips with an integrated piston are used as transfer vessels. This piston is coupled to the piston rod of the dispensing device during the pipetting operation and takes over the actual dispensing operation. Since the piston in this case can displace the entire internal volume of the tip, essentially no air cushion is formed between the aspirated sample and the end of the piston. Both classes of handheld pipetting devices, the air cushion pipettes and the direct displacement pipettes, are also referred to as piston-stroke pipettes.

There are hand-held pipetting devices whose piston system is driven manually and those with electric drive. An electrically driven hand-held piston-stroke pipette is often controllable by at least one pipetting program in order to perform at least one type of pipetting operation in an automated or semi-automated manner.

Hand-held pipettes are adapted for one-handed use by human users. However, there are also laboratory automats with robotic gripper arms whose gripper tools simulate the activities of a human hand for operating a hand-held pipette and which are set up for handling and operating a hand-held pipette.

In a pipetting device, the sample quantity dispensed by a single actuation can correspond to the sample quantity aspirated into the device. However, it can also be provided that a sample quantity taken up corresponding to several dispensing quantities is dispensed again step by step. In addition, a distinction is made between single-channel pipetting devices and multi-channel pipetting devices, wherein single-channel pipetting devices contain only a single dispensing/receiving channel and multi-channel pipetting devices contain several dispensing/receiving channels, which in particular permit the parallel dispensing or receiving of several samples.

The hand-held pipetting devices described in the context of the present invention are handheld computer-controlled electric piston stroke pipettes, also referred to as hand-held electric pipetting devices or hand-held electric piston stroke pipettes.

An example of a hand-held, electronic prior art air cushion pipette is the Eppendorf Xplorer® and Xplorer® plus from Eppendorf AG, Germany, Hamburg; examples of handheld, electronic dispensers are the Multipette® E3 and Multipette® E3x from Eppendorf AG, Germany, Hamburg.

Electric pipetting devices offer numerous advantages over non-electric pipetting devices, as a wide range of functions can be implemented in a simple manner. In particular, electric pipetting devices can simplify the execution of certain program-controlled pipetting operations by automating or partially automating them. Typical pipetting parameters for controlling such pipetting operations by means of corresponding pipetting programs relate to the volume when aspirating or dispensing liquid, their sequence and repetitions, and, where appropriate, their temporal parameters when distributing these operations over time. An electric pipetting device may be adapted to be operated in one or more operating modes.

An operating mode may provide that a set of one or more pipetting parameters of the pipetting device that affect or control a pipetting operation of the pipetting device is automatically interrogated, set, and/or applied.

Hand-held pipetting devices are known in which a touch-sensitive screen is used to allow the user to enter pipetting parameters, based on which a pipetting operation can be performed by the hand-held pipetting device in an at least partially automated manner.

Document EP 2 814 612 B1 describes a pipetting device with one or more touchscreens, by means of which pipetting operations are defined essentially entirely by touch and controlled by the user. The use of multiple touchscreens suggests the potential of using such touchscreens, but ultimately it remains speculative whether such a defined pipette is ergonomically usable.

The present invention is based on the task of providing a hand-held pipetting device with an efficient and ergonomic operating concept.

The invention solves this problem in particular by means of the pipetting device according to claim 1. Preferred embodiments are objects of the dependent claims and can also be taken from the description.

The invention relates to a hand-held pipetting device for pipetting at least one liquid sample, with a connecting section for connecting at least one pipetting container, with an electrically controlled moving member for aspirating the at least one sample into the at least one pipetting container, holding the sample in the at least one pipetting container, and dispensing sample from the at least one pipetting container when performing a pipetting operation, with a touch-sensitive screen for entering the values of user-definable pipetting parameters, wherein a parameter set of at least one pipetting parameter defines a pipetting operation, with an electrical control device which has a data processing device programmed to control the moving member as a function of the at least one pipetting parameter of the parameter set, with at least one actuating element whose actuation by the user starts the pipetting operation defined according to the parameter set. Further features of the pipetting device according to the invention result from the following description and the claims.

The advantage of hand-held, electric pipetting devices (hereinafter referred to as pipetting devices for short) lies in the electronic configurability of the pipetting operations automated or partially automated in these devices. The challenge is to find an operating concept for such devices, which can realize an unmanageable number of functions, configuration options and programming, that provides the user with an intuitively efficient and ergonomic working experience. An operating concept has been developed by the inventors which solves the task by means of several inventions, including the invention according to the present claims.

When automated pipetting operations are referred to in the following, semi-automated pipetting operations are also always meant, unless the respective context contradicts this. Performing an automated pipetting operation always includes at least one user activity that triggers at least the automated pipetting operation, usually by actuating an actuating element of the pipetting device. Partially automated pipetting operations of certain application scenarios may, for example, require that a user, in addition to starting a pipetting operation divided into partial operations, at least also starts the triggering of a partial operation by actuating an actuating element. The automated pipetting operations of a particular application scenario may, in certain embodiments of the pipetting device, be defined by a set of pipetting parameters that the user sets before starting an automated pipetting operation by means of the operating device of a user interface device of the pipetting device, and/or adopts from default settings and/or loads from a memory. Typically, the user interface of such embodiments of the pipetting device has a selection option, for example a control wheel or a list of selectable fields on a touch screen, by means of which a so-called "operating mode" is selectable, which represents the specific application scenario or in which the whole set of pipetting parameters is selected, which belong to this specific application scenario and which the user can set before the start of the associated automated pipetting operation. The automated pipetting operation then runs according to a pipetting program of this operating mode specified as an operating program.

In a preferred embodiment, the pipetting device or data processing device is programmed to allow the user to manually define an automated pipetting operation by selecting pipetting parameters, and thus in particular to define a set of pipetting parameters (pipetting parameter set) of a user-defined pipetting operation. This pipetting parameter set can correspond partially or completely to a predefined pipetting parameter set of an operating mode. Pipetting parameters of a pipetting operation preferably concern or quantify the volume to be pipetted, at the step of aspirating the sample into a pipetting container connected to the piston-stroke pipette or at the step of dispensing the sample from this pipetting container, optionally the sequence and repetitions of these steps, and optionally temporal parameters at the temporal distribution of these operations, in particular also the temporal variation of such operations, in particular the speed and/or acceleration of the aspiration or dispensing of the sample. In this embodiment, the automated pipetting operation runs according to a pipetting program that is fully defined according to these user-defined pipetting parameters.

The hand-held pipetting device according to the invention is preferably designed to be used to perform at least one pipetting operation according to at least one parameter set of at least one, or at least two, or at least three pipetting parameters, in particular to be used in at least one predetermined operating mode according to a predetermined parameter set of the pipetting device or in a user-defined parameter set. In an operating mode, one parameter set of pipetting parameters (pipetting parameter set) is preferably provided in each case, the pipetting parameters of which are optionally not selectable by the user or are optionally at least partially deselectable by the user and can be supplemented by further pipetting parameters.

A pipetting operation typically provides that, in accordance with a pipetting program, a specific sample quantity is taken up from a start container into a pipetting container, in particular a pipette tip, connected to the piston-stroke pipette, and/or is dispensed into a target container, in particular is dispensed in a metered manner. A pipetting operation can preferably be controlled by at least one, two, three or preferably several pipetting parameters, with which the said pipetting operation, or a function or component thereof, can be influenced or defined in the desired manner.

Pipetting parameters for controlling a pipetting operation relate to or preferably quantify the volume to be pipetted, in the step of aspirating the sample into a pipetting container connected to the piston-stroke pipette or in the step of dispensing the sample from this pipetting container, optionally the sequence and repetitions of these steps, and optionally temporal parameters in the temporal distribution of these processes, in particular also the temporal variation of such processes, in particular the speed and/or acceleration of the aspiration or dispensing of the sample, or the number of pre-wetting steps and optionally the volume aspirated and dispensed in each case.

These pipetting parameters are preferably at least partially and preferably completely selected and/or entered by the user, in particular via the at least one actuating element of the user interface device of a piston-operated pipette or an external data processing device.

The pipetting operation is preferably uniquely definable or defined by the pipetting parameter set. This pipetting parameter set is preferably at least partially and preferably completely selected and/or entered by the user, in particular via the operating device of the pipetting device or the external data processing device.

However, it is possible that a pipetting operation is not unambiguously defined by the pipetting parameter set; in this case, the pipetting device is in particular set up or the data processing device is programmed to automatically supplement the pipetting parameter set with at least one further pipetting parameter, in particular as a function of the (selected) pipetting parameters. It is possible and preferred that at least one pipetting parameter is not defined by the user, but is predefined by the pipetting device, for example, by being stored there in a data memory in a previously known manner or by being determined automatically.

Preferably, at least one pipetting parameter is provided with which the number of directly successive or indirectly successive pipetting volumes is determined, preferably at least one pipetting parameter with which the number of aspiration steps and/or dispensing steps and in each case preferably also the respectively associated pipetting volumes, the respectively associated pipetting speeds and/or accelerations, and/or the respectively associated time intervals between the steps are determined.

Typical pipetting parameters that can be used for manual definition of user-defined pipetting operations can be taken from the following description of typical application scenarios of automated pipetting operations:

A typical application scenario envisaged for pipetting devices as a partially automated process is dispensing (briefly referred to as "DIS") of a volume received into the pipetting container (pipette tip or dispenser tip). Each partial dispensing, e.g. dispensing a total sample of 1 ml from a pipetting container into a total of ten separate target containers of a microtiter plate, requires the user to position the pipetting device above a storage container of sample liquid to be dispensed, dip the tip of the pipetting container into the storage liquid, pick up a starting volume by actuating an actuating element, initiate a reverse stroke by actuating an actuating element, thereby bringing the system to a defined starting position, position above the first target container, starts the electrically driven delivery of a dosed partial volume of 0.1 ml by actuating an actuating element, moves and positions the pipetting device above the next target container of the microtiter plate, starts again the electrically driven delivery of a dosed partial volume of 0.1 ml by actuating an actuating element, and repeats these manually performed partial processes (positioning, triggering), followed by the automated partial process of the electrically driven partial delivery of 0.1 ml sample (of a total of 10 steps of the partial delivery) eight more times. The metered dispensing of the partial volumes is performed according to the specification of pipetting parameters including one, several or all of the following pipetting parameters: the total volume of the sample to be dispensed, the partial volumes of the sample to be dispensed and/or the number of dispensing steps for dispensing equal partial volumes, the sample uptake speed and/or any sample dispensing speed deviating therefrom, the volume of a reverse stroke, the volume of an overstroke. The dispensing function is particularly suitable for rapid filling of a microtiter plate with a reagent liquid and can be used, for example, to perform an ELISA.

Preferably, an application scenario relates to "Automatic Dispensing" (ADS) of a sample. Associated operating parameters are preferably, in each case: the volume of the individual sample, concerning the pipetting volume during one of several dispensing steps; the number of dispensing steps; the duration of the time interval according to which the dispensing steps are automatically performed one after the other at constant time intervals—the time interval can define these time intervals or, for example, the delay between the end and start of successive dispensing steps; the speed at which the sample(s) is/are taken up; the speed at which the sample(s) is/are dispensed. This dispensing function is even more convenient for filling a microtiter plate, since the user does not have to repeatedly trigger a dispensing step by actuation, e.g. pressing a key, but dispensing is time-controlled after starting automatic dispensing. The execution of the operating program belonging to such a pipetting parameter set, the automatic dispensing can take place under the condition that the corresponding program takes place at least when an actuating element is continuously actuated, e.g. when the key is continuously held down. This is advantageous, for example, in the case of long dispensing series or reactions in which exact observance of a time window is required. The automatic dispensing function is even more convenient for filling a microtiter plate, since the user does not have to initiate a single dispensing step himself here, but this is done automatically, which can be used, for example, to perform an ELISA.

Preferably, an application scenario concerns the "pipetting" (pip) of a sample. Associated pipetting parameters are in particular: the volume of the sample to be pipetted; the speed at which the sample is taken up; the speed at which the sample is dispensed.

Preferably, an application scenario concerns "pipetting with subsequent mixing" (P/Mix) of a sample. Associated pipetting parameters are preferably: the volume of the sample to be aspirated and/or the sample to be dispensed; the mixing volume; the number of mixing cycles; the speed at which the sample is aspirated; the speed at which the sample is dispensed. The "Pipetting followed by mixing" function is recommended, for example, for pipetting very small volumes. If a dispensing volume $<10$ $\mu L$ is selected, it is recommended to mix it into the respective reaction liquid. This is possible by automatically starting a mixing movement after dispensing the liquid. The mixing volume as well as the mixing cycles are defined beforehand. One application for this operating mode is, for example, the dispensing of a liquid that is heavier than water due to its physical properties, the residues of which in the pipetting container, in particular the pipette tip, are then rinsed out of the pipetting container, or the pipette tip, using the liquid that has already been dispensed. Another application would be the immediate mixing of the dispensed liquid with the presented liquid. This mode of operation is advantageous, for example, when adding DNA to a PCR mixing solution.

Preferably, an application scenario concerns the "multiple aspiration" of a sample, also referred to as "reverse dispensing" or as "ASP" for aspiration. Associated pipetting parameters are preferably, respectively: the volume of the sample(s) to be aspirated; the number of samples; the speed at aspiration; the speed at dispensing. The function is used for multiple aspiration of a quantity of liquid and dispensing of the total quantity. Multiple filling of the pipetting container in one process is not intended here. The speed is the same for all samples. In the embodiment, the following preferably occurs: Starting from the basic position, the pipetting device takes up one partial volume at a time by actuating the first type of operating device. After the last partial volume has been aspirated, the pipetting device preferably outputs a warning message, which must be confirmed by the user, preferably by actuating the second type of operating device. With the next actuation of the second type of the operating device, the total volume is dispensed again. For actuation of the first or second kind, the operating device preferably has at least two actuating elements, one for inputting an operating signal of the "first kind" to the control device, and one for inputting an operating signal of the "second kind" to the control device. In particular, the operating device can have a rocker, which in particular can be pivoted about an axis perpendicular to the longitudinal axis of the pipetting device, between a first signal triggering position ("rocker up") for actuation of the first type and a second signal triggering position ("rocker down") for actuation of the second type.

Preferably, an application scenario concerns the "diluting" (Dil) of a sample, also referred to as "dilution". Associated pipetting parameters are preferably, respectively: the sample volume; the air bubble volume; the diluent volume; the speed of uptake; the speed of delivery. The maximum diluent volume=nominal volume−(sample+air bubble)). This function is used for the uptake of a sample and a diluent with separation by an air bubble and delivery of the total volume. The speed is the same for all partial volumes. Preferably, the following happens in the execution: Starting from the home position, the pipetting device first picks up the diluent volume, then the air bubble and finally the sample. Each pick-up is preferably triggered separately by an actuation of the operating device of the first type. After that, the total volume is dispensed in one.

Preferably, an application scenario concerns "Sequential Dispensing" (SeqD) of samples. Associated pipetting parameters are preferably in each case: Number of samples (preferably up to a fixed maximum number Nmax of preferably 5<=Nmax<=15, preferably Nmax=10); Individual volume of individual samples; Speed of uptake; Speed of dispensing. This function is used for sequential dispensing of Nmax freely selectable volumes, in this case multiple filling of the pipetting container is preferably not provided. The speed is the same for all samples. The number of samples is preferably the leading parameter for the input of the individual volumes. When entering the volumes, the pipetting device must preferably always check that the maximum volume of the pipetting devices is not exceeded; if necessary, a warning message is output. After all parameters have been entered, the pipetting device picks up the total volume after the first type of operating device has been actuated and picks up an individual volume after the second type of operating device has been actuated. All further processes behave preferably like normal dispensing.

Preferably, an application scenario relates to "Sequential Pipetting" (SeqP) of samples. Associated pipetting parameters are preferably in each case: Number of samples (preferably up to a fixed maximum number Nmax of preferably 5<=Nmax<=15, preferably Nmax=10); Individual volume of individual samples; Speed of uptake; Speed of dispensing. This function is used for pipetting maximum Nmax freely selectable volumes, which are programmed before the start and are fixed in their sequence. The speed is preferably the same for all samples. However, the speed can also be set differently. The sequence of the function corresponds to the pipetting sequence. The previously entered volumes are processed in the programmed sequence. After dispensing, an actuating element is actuated, e.g. by pressing a key, to decide whether the next sample should be taken or whether a "blowout", i.e. a complete, safe blowing out of the sample still contained in the pipetting container by means of an overstroke, should be performed before the next sample is taken and/or whether the pipetting container should be changed.

Preferably, an application scenario concerns "reverse pipetting" (rPip) of samples. Associated pipetting parameters are preferably in each case: the volume of the individual sample; the speed of aspiration; the speed of dispensing; activation of the counter. In this "rPip" function, more than the volume to be dispensed is aspirated. This is achieved by moving the piston down before the liquid is aspirated, namely by actuation of the second type, i.e., e.g., by pressing the key or "rocker down", to the lower position of a blowout, i.e., an overstroke of the piston that exceeds the position of the piston during a pipetting stroke. When the volume pick-up is started, the pipetting device picks up the volume of the blowout and the set volume. To take out the play in the drive in the dispensing direction, the pipetting device completes an additional stroke, which is immediately dispensed again. This is similar to dispensing, but is preferably performed with automatic delivery of the reject stroke at maximum speed.

In the "rPip" application scenario embodiment, the following preferably occurs: the piston of the pipetting device (or dispensing tip) automatically moves to the blowout and stops in the down position. Secondly, an actuation of the first type of the operating device takes place: piston moves up by the blowout distance and by the stroke for the pipetting volume. Thirdly, the second type of operating device is actuated: the piston moves down the stroke for the pipetting volume and stops before the blowout. Fourthly, two actuations of the second type of operating device are performed: the piston performs the blowout and stops in the lower position. As an alternative to "fourth", the first type of operating device is actuated: the piston moves the pipetting stroke upwards. The "rPip" mode is particularly suitable for pipetting plasma, sera and other liquids with a high protein content. The "Pipetting" mode is particularly suitable for aqueous solutions. The "rPip" mode is particularly suitable for solutions containing wetting agents in order to minimize foam formation during dispensing into the target vessel. The liquid is aspirated in particular with overstroke (blowout volume). In this case, the overstroke is typically not part of the dispensing volume and is preferably not dispensed into the target vessel. In particular, if the same sample is used again, the overstroke may remain in the tip. If another liquid is used, preferably the overstroke and/or preferably the pipetting container is discarded.

An operating program, in particular a control program for carrying out the desired pipetting operation, is preferably controlled by a pipetting parameter set. The control program can in each case be formed in the form of electrical circuits of the control device, and/or be formed by an executable program code which is suitable for controlling a control device which is program code controllable and is preferably programmable.

The pipetting device or an external data processing device is preferably designed to automatically check the pipetting parameter values (pipetting parameter values) entered by the user and to compare them with an allowed range of the respective pipetting parameter. If the pipetting parameter value entered by the user is outside the permissible range, the entry is either not accepted, a warning is issued on the screen and/or acoustically, or set to a default value, which can be, for example, the minimum value or the maximum value or the last permissible value entered, or an automatically corrected value is used.

Preferably, the pipetting device has at least one touch-sensitive or non-touch-sensitive screen and/or preferably a number of at least partially predefined display pages (also referred to as "screen pages") stored in the pipetting device in the form of display page data, which can be displayed in one, or distributed over several screens, preferably full-screen. Preferably, the screen area is substantially rectangular, or possibly square. In the case of a non-square rectangle, it is particularly preferred that the shorter side of the rectangle is arranged perpendicular to the longitudinal axis A of the pipetting device. In this way, a list of entries standing one below the other, in particular lines, can be longer. In the case of a non-square rectangle, it is also preferred that the longer side of the rectangle is arranged perpendicular to the longitudinal axis A of the pipetting device. In this way, an arrangement of juxtaposed entries, especially columns, could be longer.

The data processing device is preferably programmed to display a graphical user interface (GUI) in the display screen. In the description of the GUI, the phrase "the data processing device is programmed to" is partially omitted below and only the GUI and its mode of operation are described, always meaning that the data processing device is programmed to implement the corresponding GUI and its mode of operation. This implementation is a routine activity for the person skilled in the art.

The GUI includes the functions—and the data processing device is accordingly programmed to display at least one screen page (in particular: "homescreen") in the screen in which pipetting parameters of a parameter set of pipetting parameters are displayed. Accordingly, the data processing device is programmed to display in the screen a screen page in which pipetting parameters of a parameter set of pipetting parameters are displayed. The expression "a pipetting parameter is displayed in the screen" means that the currently set value of the pipetting parameter is displayed in the screen. In addition, a description of the pipetting parameter can be displayed, in particular a text description, a characteristic pictogram, or a physical unit of the quantity described by the pipetting parameter, if the pipetting parameter concerns one, e.g. "μL" for a volume. However, the skilled person can also know or learn from the context to which pipetting parameter a displayed value is assigned, even if a description is missing in the screen.

In particular, the data processing device is programmed to display the screen page, a home screen, synonymously also referred to as a homescreen (analog: homepage in Internet browsers). It is preferred that a plurality or plurality of user inputs to the GUI lead back to this homescreen. This homescreen can advantageously be used to display the entire parameter set of a user-defined—or taken from a pre-stored application scenario—pipetting operation and to enable settings of the associated pipetting parameters. The homescreen is displayed in particular after the pipetting devices have been switched on, in particular immediately after switching on, whereby it is possible that purely informative pages are still displayed temporally before the homescreen, e.g. a company logo, device information, etc. The switching on can be effected by a user operation of the display or an actuating element, or can be effected by the measurement of a sensor, e.g. an acceleration sensor, movement sensor, proximity sensor etc. Such a home screen has proven to be an intuitively graspable center of the operating concept of the pipetting device for the users.

The home screen preferably displays the pipetting parameters of the currently valid parameter set as the default selection. In addition, the data processing device can be programmed in particular to perform one, several or all of the following displays for the homescreen:

After switching on the pipetting device, the pipetting parameters of a base parameter set are displayed;

After switching on the pipetting device, the pipetting parameters of the last set base parameter set are displayed;

After switching on the pipetting device, the pipetting parameters of the last set base parameter set that was also executed at least partially or completely or that was only set but not executed are displayed;

After a period of inactivity of the pipetting device—in particular after a possible standby mode—the pipetting parameters of a base parameter set are displayed; this base parameter set is in particular the pipetting parameter set displayed after switching on the pipetting device; "inactivity" can mean that no user operation or touching of the display was detected on the device for a predefined time—predefined according to the factory setting or defined by the user—and/or that an optionally available sensor (e.g., an acceleration sensor, movement sensor, proximity sensor) of the pipetting device did not detect any movement and/or approach of a user. and/or that an optionally available sensor (e.g. an acceleration sensor, motion sensor, proximity sensor) of the pipetting device has not detected any movement and/or approach of a user. The standby mode can be activated automatically after a predetermined period of inactivity.

After a period of inactivity of the pipetting device—in particular after a possible standby mode—the pipetting parameters of the last set base parameter set are displayed;

After a period of inactivity of the pipetting device—in particular after a possible standby mode—the pipetting parameters of the last set base parameter set which was also executed at least partially or completely or which was set but not executed are displayed.

Preferably, the screen page includes at least one first input tile which displays the value of at least one—or exactly one—first pipetting parameter of a parameter set, in particular a base parameter set, which defines a pipetting operation, in particular a basic pipetting operation. The number of input tiles displayed in the screen page preferably corresponds to the number of pipetting parameters of the parameter set. The base parameter set preferably includes at least or exactly one pipetting parameter, preferably includes at least or exactly two pipetting parameters, preferably includes at least or exactly three pipetting parameters, preferably includes at least or exactly four pipetting parameters, preferably includes at least or exactly five pipetting parameters, preferably includes at least or exactly up to ten pipetting parameters, or more pipetting parameters. In particular, the data processing device is programmed to start the pipetting operation associated with the pipetting parameter set when the user—with the screen or homescreen displayed—actuates an—in particular any—actuating element.

Preferably, touching an input tile of a screen page, in particular the first input tile, opens an input interface that allows the user to enter the value of the associated pipetting parameter, in particular the at least one first pipetting parameter.

An input tile is understood to be a marked input area of the screen page displayed on the touchscreen, the touching of which represents an input, with the programming preferably starting a follow-up action as a result of this touch, in particular the display of an input interface. It may be that the detection area, which is evaluated by the control program as input for this input tile, differs from the marked area, e.g. is larger, but preferably the marked area, i.e. the visible input tile, corresponds to the detection area. If the detection area is larger than the marked area, incorrectly located touches are also detected as input. If the detection area is smaller than the marked area, the user is trained to correctly localize the touch of the input tiles, and the distance of adjacent input tiles can be reduced without increasing the number of wrong localizations, thus making better use of the available area for input/output. These tolerance solutions are acceptable or promote user satisfaction as long as the touch does not hit the detection area of another input tile or input field of the screen page. The visible input tile is preferably a substantially rectangular area, since rectangles of the on a substantially rectangular display make the best use of the available area for inputs and outputs. However, such an area may also be otherwise, for example: hexagonal, circular segment, polygonal, and/or rounded. Preferably, the width b of an input tile extends over a portion X of the total width B of the screen—viewed in particular perpendicular to a longitudinal axis A through the pipetting device. Here, preferably $0.8<x<1$, preferably $0.9<x<1$, preferably $0.95<x<1$. The large width of the input tiles makes input convenient. Here it is meant that $b=B*x$.

Preferably, the background of an input tile is light, in particular white, and the information displayed on it is dark, in particular blue or black. However, it can also be the other way around, for example in a night mode of the display, in which case the background is dark and the information in brighter. Preferably, there is sufficient contrast with the background to keep the information legible to the user in any usual lighting, from darkness to sunlight. Preferably, the pipetting device includes a photosensitive photosensor. Preferably, the control means, in particular the data processing device is arranged or programmed to maintain the screen brightness of the screen in a predetermined relationship to the light intensity received from the photosensor, which may mean that the screen brightness is increased when the intensity of the external light increases and, in particular, the screen brightness is decreased when the intensity of the external light decreases. However, the screen brightness can also be constant, can in particular be predefined at the factory, can be automatically adjustable depending on further parameters—e.g. depending on a loaded application scenario or also a loaded user profile, and/or can be adjustable by the user.

Preferably, the screen page, in particular the home screen, has at least one input field, the touching of which enables the selection of at least one second pipetting parameter by the user. In order to realize these input possibilities, several solutions advantageous in this pipetting device have been found. In a first solution, the input field is a marked area at an edge of the screen page, in particular of the home screen, in particular in a lower or upper edge area, in order not to interrupt the list of input fields preferably displayed there. The special position of this input field compared to the input tiles displayed there then clarifies the special function, namely opening a new screen for selecting and/or deselecting new pipetting parameters (also: "selection screen") to be added to (or deselected from) the current parameter set. After closing the selection screen, the at least one selected pipetting parameter is added to the current parameter set and displayed on the screen page. In a second solution for selecting/deselecting pipetting parameters, the screen page has a size, in particular length or width, that exceeds the display area available on the screen for displaying the screen page. In this initially invisible area of the screen page, input tiles can be provided, which in particular each contain a value or information describing the value of the pipetting parameter belonging to the input tile—e.g. a switch showing the "on/off" of a particular pipetting parameter, in particular the "on/off" of the function represented by this pipetting parameter.

The screen page may be larger than the display area available in the screen for displaying the screen page; in this case, the screen page can be scrollable, e.g. vertically scrollable. However, it may also be scrollable in that tapping an area of the screen or wiping the screen-based on the basically known input gesture "wiping" leads to scrolling of the screen content, i.e. to the display of that area of the screen page which follows below or above or to the side of the currently displayed area of the screen page.

The term "selection" refers in particular to the activation of a pipetting parameter from a predefined total set of pipetting parameters which may be stored in the data storage device of the pipetting device. Activation of the pipetting parameter may have the immediate consequence of adding it to the current set of parameters, but there may also be an intermediate confirmation dialog by which the user confirms—or prevents—this addition. Deselect" is defined accordingly: Deactivation of the activated pipetting parameter—and corresponding change of the user-defined user parameter set).

Preferably, the data processing device is programmed, after detection of this user-activated selection of a pipetting parameter, in particular of a second pipetting parameter, that the at least one—in particular second—pipetting parameter is added to the at least one first pipetting parameter of the parameter set, in particular of a base parameter set, in order to form with this at least one first pipetting parameter the pipetting parameters of a user parameter set defining a user-defined pipetting operation, and this selection of the at least one second pipetting parameter is displayed to the user in the screen page, in particular the home screen.

It is considered to be an independent invention that the data processing device of the pipetting device is programmed to display a graphical user interface (GUI) in the screen, wherein the GUI includes at least the following: Display of a screen page, in particular a home screen, in the screen in which pipetting parameters of a parameter set of pipetting parameters are displayed, wherein the screen page includes at least a first input tile which displays the value of at least a first pipetting parameter of a parameter set, in particular a base parameter set which defines a pipetting operation, in particular a basic pipetting operation, and touching of which opens an input interface which allows the user to enter the value of the at least one first pipetting parameter, the screen page having at least one input field, the touching of which enables the selection of at least one second pipetting parameter by the user, wherein the data processing device is programmed, after detection of this user-activated selection, to add the at least one second pipetting parameter to the at least one first pipetting parameter of the parameter set, in particular of the base parameter set, to form with this at least one first pipetting parameter the pipetting parameters of a user parameter set defining a user-defined pipetting operation, and this selection of the at least one second pipetting parameter is displayed to the user in the screen page, in particular home screen.

Said invention provides a particularly advantageous aspect of the innovative operating concept of a pipetting device. From user studies it became known to the inventors that for a significant fraction of users a more efficient workflow can be produced with a pipetting device in which the user defines the desired pipetting operations mostly according to his own wishes by adding pipetting parameters, i.e. functions or features, to an existing, e.g. a proven parameter set or a base parameter set. This approach obviously leads optimally efficiently to the goal of defining an individually desired pipetting operation. In particular, if a base parameter set is provided on a screen, especially a home screen, which is immediately executable, a sense of achievement in operation is immediately provided without the need for lengthy study of operating instructions. Within a short learning time, users orient themselves in the list of possible pipetting parameters, and thus more efficiently exploit the potential of the great functionality of an electric pipetting device. This is especially true for the large group of users who, with known prior art pipetting devices, have difficulty learning existing—more or less complex—operating modes representing application scenarios, and then settle for the simplest operating modes. The novel concept invites inexperienced users to learn functions and offers full flexibility to experienced users.

It should be noted that the aforementioned approach of defining a user parameter set does not exclude that—for example by means of separate screen pages—also other, in particular more complex, parameter sets intended for selection by the user can be offered, which represent certain predefined application scenarios, which are parameter sets stored by the user, or which are automatically stored parameter sets of a list of parameter sets applied earlier in time (this list also referred to as parameter set history), or which are the statistically most frequently executed parameter sets, or a favorite list of parameter sets determined by the user.

Such separate screen pages form a component of the GUI, which, like preferably any other screen page, are displayed on the screen in particular in accordance with a program or program code stored in a data storage device, in particular an operating program or control program. Examples of such screen pages, which are preferably components of the GUI, are as follows:

Preferably, a favorite screen page is provided in which one or more pipetting parameter sets, optionally limited to a maximum total number M1, are displayed, in particular listed, which were previously created by the user or which were loaded by the user from another screen page and which were marked as a favorite by the user by means of an input option, e.g. by touching an input field which may be provided in a menu and/or navigation bar arranged in particular at the edge of the screen, in particular an input field with a star-shaped pictogram or another appearance.

Preferably, a history screen page is provided in which one or more pipetting parameter sets, optionally limited to a maximum total number M2, are displayed, each of which is formed by a historical pipetting parameter set, in particular executed in the past and in particular automatically stored, which reproduces a historical pipetting operation.

Preferably, a program set screen page is provided in which one or more pipetting parameter sets, optionally limited to a maximum total number M3, are displayed, in particular listed, which have been created by programming by the user. This programming can be carried out in particular on a programming screen page on which the user, in accordance with a modular system, compiles program steps step by step from predetermined the sequence of a pipetting operation definable by pipetting parameters in program steps, whereby these inputs are automatically checked for consistency in particular by the control program or another program and from this the corresponding programmed pipetting parameter set is created and, in particular according to the user's specification, is added to the program set screen page, i.e. in particular is stored. Programming can also be performed on an external data processing device, in which case the externally created programmed pipetting parameter set is transmitted to the pipetting device by means of a communication device of the pipetting device. In particular, programming is performed by means of a programming (macro) language implemented in the pipetting device, which can be suitably provided by the skilled person, in particular by means of input fields, text descriptions and pictograms optionally selectable in the GUI, which the user then adds together step by step. Preferably, however, the recorder function generates a program (macro) code which is then editable again by the user, in particular in the programming screen page.

Preferably, an autoprogram set screen page is provided in which one or more pipetting parameter sets, optionally limited to a maximum total number M4, are displayed, in particular listed, which were previously derived automatically, i.e. essentially without user intervention, by a recorder function of the pipetting device from setting steps of pipetting parameters and/or pipetting operations manually set and executed by the user and then stored in particular in the data storage device. Typically, this recorder function is triggered in which an input field of the GUI is touched by the user defining the start of the recording of the recorder function, and in particular, this recorder function is terminated in which an input field of the GUI is touched by the user defining the end of the recording of the recorder function. To create the steps of a desired pipetting program, starting from a home screen with arbitrary desired pipetting parameters, the values of these pipetting parameters are defined and the actuating elements are actuated to perform the recording or dispensing of sample volumes in a desired manner—simulated or not simulated, meaning that the moving member moved by the motor either preferably cannot move or preferably can move after actuating the actuating elements. By this "teach-in" feature of the recorder function, while setting one's pipette and performing pipetting, the associated pipetting parameter set can be created and stored, especially without the user having to deal with any programming (macro) language implemented in the pipetting device. Preferably, however, the recorder function generates a program (macro) code which can then be edited again by the user, in particular in the programming screen page.

Preferably, a scenario screen page is provided in which one or more pipetting parameter sets, optionally limited to a maximum total number M5, are displayed, in particular listed, which have been provided by the manufacturer in particular. These pipetting parameter sets can define one, several or all of the application scenarios described at the beginning. The corresponding pipetting parameter set is selected by touching the input field or the input tile which stands for the corresponding application scenario and has a corresponding short designation.

A pipetting parameter set on one of the aforementioned screen pages can be represented by an input field, in particular an input tile, which can be touched by the user to make the corresponding pipetting parameter set the current pipetting parameter set, whose pipetting parameters are then displayed on the (main) screen page—according to patent claim—, in particular the homescreen, or a separate screen page. The transfer of the pipetting parameter set directly to the central screen page, in particular homescreen, is also referred to as quick selection. When transferring to the separate screen page, input options can be provided in particular to create a new program with the pipetting parameters of the selected pipetting parameter set, to edit the pipetting parameter set and to delete it or components thereof.

Said total number M1, M2, M3, M4, M5 can in particular be selectable, or can be fixed, e.g. to any number between 1 to 50, in particular 2 to 30, in particular 5 to 25.

The base parameter set can comprise in particular three pipetting parameters, in particular the pipetting parameters volume V, velocity v (two-component, vectorial parameter: of aspiration/dispensing), number of repeat steps n (of this aspiration or dispensing). The volume is in particular a volume to be aspirated into or dispensed from the pipetting container during a single aspiration and/or dispensing. For the volume, information about the physical unit is preferably also displayed in the input tile, e.g. mL or μL. The velocity is in particular a vectorial value, which contains the two semantically associated, because related to pipetting velocity, information about the velocity of the uptake of the liquid into the sample container and the velocity of the dispensing from the sample container. The numerical values belonging to the velocity can be proportional to the rate of the liquid volume exchanged between the pipetting container and the environment (alternative: non-proportional relationship). User selectable velocities may be given by velocity levels, which may be represented by ordinal numbers e.g. 1 . . . 10 or letters A . . . J or other symbols, where level 4 need not represent twice the velocity compared to level 2, but may. In particular, a base parameter set is chosen to define an executable pipetting operation, as is the case in particular in the example given (V,v,n).

Preferably, an input field is provided as an extra button, in particular only one input field is provided, which is designed as an extra button, which in particular has a different shape and/or color and/or background color than the input tiles displayed on the screen, and/or an edge position in the screen. Touching the extra button preferably causes the display of a selection screen, instead of the screen, home screen, and as the latter overlaying screen (overlay)), in particular of a predetermined selection set of available, i.e. stored in a data storage device, pipetting parameters in the form of a selection list which contains information, in particular brief descriptions (for identifying the content of the pipetting parameter) about selectable second pipetting parameters from which the user can select the at least one second pipetting parameter.

Preferably, after termination of the selection of the at least one second pipetting parameter, the selection screen or the selection list is closed and the screen page, in particular homescreen, is displayed again, which now also displays, in addition to the at least one first input tile, at least one second input tile representing the selection and/or a value of the at least one second pipetting parameter or information representing this value about this at least one second pipetting parameter. The phrase "at least one first input tile" means in particular that, for example, exactly three "first input tiles" may be provided, so that the optionally added "at least one second input tile" may be the fourth of the now displayed four input tiles.

Preferably, in the event that the at least one second pipetting parameter can assume a user-selectable value, touching the at least one second input tile—within the selection screen/list or after closing the selection screen/list—opens an input interface that allows the user to enter the value of the at least one second pipetting parameter.

According to the second solution for the selection of further pipetting parameters for the current parameter set, a set N>=1 of input fields, in particular input tiles, is preferably displayed on the screen page, in particular as a scrollable or scrollable list of input tiles, wherein an information, in particular a short description, a pictogram, and/or a physical unit, about a second pipetting parameter which can be selected by means of the input field is assigned to each input field and is displayed.

Preferably, after the user-activated selection of the at least one second pipetting parameter from the set N of input fields, the selection and/or a value or information representing this value of the at least one second pipetting parameter is displayed.

Preferably, in the event that the at least one second pipetting parameter can assume a user-selectable value, touching the at least one second input tile now displayed on the screen/homescreen allows the user to enter the value of the at least one second pipetting parameter.

Preferably, the data processing device is programmed to display in the screen a screen page, in particular a home screen, which includes at least one first input tile that displays the value of at least one first pipetting parameter and the touching of which opens an input interface that allows the user to enter the value of the at least one first pipetting parameter.

This input interface is preferably a screen area in which a numeric keypad is displayed, the numeric keys of which are individually touchable and usable by the user to enter a sequence of digits defining the value of the at least one first pipetting parameter. The screen area may also be the screen area of a new screen page that replaces the current screen page. The input interface may also include a scrollable selection list, or other input such as an input roller, of possible numerical values or other selectable fields provided with information, or a parallel display of a plurality of possible selectable numerical values. Preferably, the input interface has an input field in which the previously made value change is confirmed by the user. Preferably, the input interface has an input field in which the input or value setting is canceled and the screen page, in particular the home screen, is returned to. Preferably, the input interface, preferably the screen page, in particular the home screen, has an input field whose touching removes the pipetting parameter last added to the parameter set by selection, in particular the at least one second pipetting parameter, from the parameter set again, or which undoes the last change made to the value of a pipetting parameter ("undo" function) or which resets the parameter selection to a default selection, in particular to a base parameter set.

The input interface may in particular have a number field, at least one selection field for selecting from a list, in particular a pull-down menu, at least one picker wheel, and other means for causing a numerical value of a parameter, in particular a pipetting parameter, to change from a touch of the screen.

Preferably, the data processing device is programmed such that if the value entered by a user via an input interface for a pipetting parameter is invalid, information is displayed on the screen and preferably at least one correction button is displayed, the touching of which, either instead of the value entered by the user, automatically performs at least one correction operation, which may have the following embodiments:

instead of the invalid value, a valid value is automatically set;

at least one pipetting parameter alternative to the said pipetting parameter is selected and, in particular, is occupied by the value of the user or another suitable value;

it will undo the user's input and, in particular, allow it to be re-entered;

and/or an error message is output;

and/or the change of the previously current value is ignored and the previously current value is kept;

and/or another non-combinable pipetting parameter representing a non-combinable function is automatically deselected.

Preferably, the data processing device is programmed to display in the screen a screen page, in particular home-screen, containing a list of substantially rectangular input tiles, which are arranged in particular one below the other and extend in particular substantially over the entire screen page. In this way, the available space is optimally used and operation is ergonomic.

Preferably, the data processing device is programmed to display in the screen a start screen page (homescreen), which is in particular this screen page for displaying the pipetting parameters of a parameter set of pipetting parameters, and which is replaced by a sideways or vertically directed swipe gesture by a second screen page and which is replaced by a sideways or vertically opposite swipe gesture by a third screen page. This does not exclude that further screen pages can be displayed by further swipe gestures, starting from the second or third screen page.

Preferably, the data processing device is programmed such that the second screen page has a list of input fields, wherein each input field has a short designation and wherein touching the input field loads a predetermined parameter set defining a predetermined pipetting operation, wherein, in particular, after touching this input field, a screen page other than the start screen page is displayed, or, alternatively, the start screen page with the input tiles of the predetermined parameter set is displayed again.

Preferably, at least one screen page is provided which provides the following special function of the pipetting device: the pipetting parameter of a target volume is required, which can be entered or changed via an input field. By continuously actuating an actuating element, liquid is aspirated into the pipetting container until the target volume is reached. Analogously or alternatively, the special function for dispensing a target volume of liquid is optionally provided: By continuously actuating an actuating element, liquid is dispensed from the pipetting container until the target volume is reached. This imitation of the mode of operation of a conventional mechanical pipette provides users with a certain amount of additional control, for example, to interrupt a pipetting operation for a short time and, in particular, to pipette in a more controlled manner.

Preferably, the data processing device is programmed to cause the third screen page to have a list of input fields, wherein each input field has a short name, and wherein touching the input field loads one of the following sets of parameters:

a historical parameter set, used in the past and automatically stored, which defines a historical pipetting operation;

Parameter sets that represent certain predefined application scenarios; parameter sets that are user-saved parameter sets;

Parameter sets that were statistically executed most frequently;

Parameter sets belonging to a favorite list of parameter sets determined by the user;

Parameter sets created by programming by the user or automatically created by a recorder function of the pipetting device implemented by means of a program code—which may in particular be part of the control program of the pipetting device—from individual setting steps manually set by the user or pipetting operations performed;

wherein, in particular, after touching this input field, a screen page other than the start screen page is displayed, or, alternatively, the start screen page with the input tiles of the predetermined parameter set is displayed again.

The screen (also referred to as "display") is a touch-sensitive screen (also referred to as "touchscreen"). It is preferably a color display.

A touch screen can serve as an input medium, a non-touch-sensitive screen can at least serve as an output medium for outputting information, or can serve as an input medium in combination with (a) control element(s) arranged next to the screen, in particular if screen areas inform about the function of the respective control element, which is then designed as a so-called soft key, which in particular can perform a variable function.

The screen is preferably essentially rectangular. Using essentially rectangular input tiles and/or rectangular information fields displayed in the screen, the screen area can be optimally used in this way.

Preferably, the screen is substantially planar. This can improve readability by allowing the user to select the least reflective angle of alignment to light sources in a laboratory to perform the operation, whereas with curved screens, light is captured from a wider solid angle and reflected into the user's eye.

Preferably, a planar screen is aligned with planar sections of a housing front in which the screen is placed. This makes it easier to touch areas of the touchscreen close to the edge if it is protected all around by the housing front.

Preferably, according to a particular inventive embodiment of the operating concept, the data processing device is programmed to display in the screen a screen page, in particular an output screen page, in particular containing a separate input area, in particular also referred to as a special button, touching of which causes the output screen page to be closed and the input screen page or another screen page to be displayed in the screen, it also being possible for this other screen page in particular to allow parameter values contained in the pipetting parameter set to be edited. Touching the special button can also cause an ongoing pipetting operation to be aborted, whereby it is possible that this abort must be confirmed by the user by means of a confirmation prompt. The termination of a completed pipetting operation also leads in particular to the fact that—without touching the special button being necessary—an input screen page is displayed again instead of the output screen page, whereby the information about the successfully performed pipetting operation can still be output before/after. It does not have to be exactly the previous input screen page to which one returns by means of special button, if e.g. only fast the speed is to be adapted, if the pipetting sequence ("do") already began. It may be possible to change/correct only certain parameter values of the current pipetting parameter set after the pipetting operation has started, rather than all parameter values.

The distinction between the input mode ("set") represented by the input screen page and the output mode ("do") defined by the output screen page prevents in particular an accidental change of parameter values while the "do" mode is running, which could possibly destroy a-laboratory work and mean considerable loss of value. On the other hand, the change from "set" to "do" mode by pressing the actuating element means considerable convenience for the user and is intuitively understandable. This also contributes significantly to ergonomics and an efficient workflow.

The distinction of the input screen side and the output screen side can be made by one or more of the definitions mentioned below. In each case, the definition particularly preferably relates to the state of the pipetting device in which the pipetting operation has been started and the electrically controlled moving member is moved; it may then be the case that the definition does not apply if the state of the pipetting device is present in which the pipetting operation has been started and the electrically moving member is not moved. This results in the possibility, for example in the case of a multi-step pipetting operation, of displaying an output screen page after a completed pipetting operation or a completed sub-step of a multi-step pipetting operation, which allows a pipetting parameter of the parameter set to be changed, but preferably not all-pipetting parameters of the parameter set which were changeable in the previously displayed input screen, in particular which were changeable in the input screen displayed immediately before the pipetting step was started. For example, it may be useful to allow the user to change one or more individual pipetting parameters during a multi-step pipetting operation, in particular those which do not critically influence the successful execution of the pipetting operation being performed. The aspiration and/or dispensing speed, also referred to as pipetting speed, can be such a pipetting parameter, the change of which does not necessarily change the pipetting operation as a result and which can thus be adapted to the user's needs—in the meantime or between completed sub-steps of the pipetting operation. Possible definitions:

Preferably, the output screen page, but not the input screen page, has the input field referred to as a special button, the touching of which causes the (output) screen page to be closed and this input screen page or another input screen page to be displayed on the screen.

If the output screen page has the special button, it is clear that the input screen page, especially the home screen, does not have the special button, since the special button is defined as one that closes the output screen page, which must therefore be currently displayed.

Preferably, the input screen page, but not the output screen page, has an input field referred to as an extra button, touching of which enables the user to change the set of pipetting parameters of the parameter set which is subsequently displayed in the input screen page. Preferably, the input screen page, but not the output screen page, has an input field referred to as an extra button, touching of which causes the display of a selection screen which, in particular, displays a predetermined selection set of available, i.e. stored in a data storage device, pipetting parameters in the form of a selection list which contains information, in particular brief descriptions (for identifying the content of the pipetting parameter) about selectable second pipetting parameters from which the user can select the at least one second pipetting parameter; where "first pipetting parameters" are understood to be those which have already been previously displayed in the input screen page, while "second pipetting parameters" are understood to be those which are added to the first pipetting parameters.

Preferably, the input screen page, but not the output screen page, has an input field which displays a pipetting parameter, in particular its numerical value, and the touching of which, immediately, i.e. in particular without any substantial delay and in particular without any further user action being required, opens an input interface with which the user can change the value of the displayed pipetting parameter.

Preferably, the output screen page and/or a further output screen page subsequently displayed on the output screen page does not have any possibility to change the, in particular more than half of the, in particular all of the, pipetting parameters previously displayed in the input screen page and changeable by input. Preferably, the output screen page and/or a further output screen page subsequently displayed on the output screen page does not have any possibility to change the total number or a part f (in particular: f>¾ or f>⅔ or f>½ or f>⅓ or f>¼) or at least one of the pipetting parameters previously displayed in the input screen page and changeable by input.

Preferably, the output screen page and/or a further output screen page subsequently displayed on the output screen page has no possibility, in particular no input field, to change, in particular directly and/or indirectly change, at least one predetermined pipetting parameter previously displayed in the input screen page and changeable by input.

This at least one predetermined pipetting parameter is preferably selected from the following list of possible pipetting parameters:

{a volume to be aspirated or dispensed during the pipetting operation; a number of partial steps, in particular the total number, in a pipetting operation comprising several partial steps, in particular a number (greater than zero) of prewetting steps in a pipetting operation, a liquid being aspirated into the pipetting container and dispensed again during a prewetting step, in particular in order to wet the inner surface of a pipetting container before the start of the actual pipetting operation; a time parameter, in particular a duration of a pipetting operation or of a sub-step of a multi-step pipetting operation, or a latency time between pipetting operations or between sub-steps of a multi-step pipetting operation; a parameter concerning the automatic execution/non-execution of a complete dispensing of a residual volume remaining in the pipetting container after execution of the pipetting operation ("auto blow off" function activated or deactivated); a speed parameter concerning the speed of a pipetting operation, in particular the speed of aspiration or dispensing of sample volume into/from the pipetting container, in particular during partial steps of a multi-step pipetting operation, in particular dispensing process}.

The pipetting volume can be a volume to be aspirated into the pipetting container during the pipetting operation or during a sub-step of a multi-step pipetting operation, or can be a volume to be dispensed from the pipetting container during the pipetting operation or during a sub-step of a multi-step pipetting operation, in particular the dispensing volume to be dispensed during a multi-step dispensing process.

Preferably, the output screen page or a subsequently displayed output screen page, in particular apart from the special button, has no input field, in particular no input field, the touching of which results in a, in particular immediate, change in the contents of the output screen page and/or a, in particular immediate, change in the started pipetting operation.

Preferably, the output screen page or a subsequently displayed output screen page, in particular apart from the special button, does not have an input field for changing any of the pipetting parameters which were displayed in the previously displayed input screen page and were changeable there by an input.

Preferably, the output screen page or a subsequently displayed output screen page, in particular apart from the special button, does not have an input field for changing a pipetting parameter, the touching of which, in particular directly or indirectly, enables the modification of one or more or all pipetting parameters of the parameter set of pipetting parameters entered by means of the input screen page, in particular in order to modify at least one predetermined pipetting parameter previously displayed in the input screen page and modifiable by input, and/or in order to modify in particular one of the pipetting parameters of an ongoing pipetting operation. "Immediately change" means in particular that after touching the input field, an input interface opens immediately in which the user can change the value of the displayed pipetting parameter. "Change indirectly" means in particular that an input screen page with at least one input field opens first, the touching of which immediately opens an input interface in which the user can change the value of the displayed pipetting parameter.

Preferably only in the input screen page, in particular in the home screen, the change of at least one, several or all changeable pipetting parameters of a parameter set of pipetting parameters is provided, but not in the output screen page. In particular, only an input screen page, but not the/an output screen page, includes an input field, in particular at least one first input tile, which in particular displays the value of at least one first pipetting parameter of a parameter set, in particular a base parameter set, which defines a pipetting operation, in particular basic pipetting operation, and the touching of which—namely without any further user input following this touching—opens an input interface which allows the user to enter the value of the at least one first pipetting parameter. These pipetting parameters of the parameter set of pipetting parameters may in particular be selected from the above list of possible "predetermined operating parameter".

Preferably, the output screen page, but not the input screen page, displays different contents, in particular the values of the pipetting parameters defining the currently running sub-step, e.g. the dispensing of a sub-volume Vt at a specific dispensing speed v2, as sub-step i of a total of N steps of the pipetting operation, depending on the sub-step of an auto-mated multi-step pipetting operation currently taking place. This may be the case, for example, in the "Dis" application scenario.

Preferably, the output screen page, but not the input screen page, displays a progress indicator depending on the substep of an automated multi-step pipetting operation currently taking place, which contains information about the progress of the multi-step pipetting operation.

Preferably, the output screen page, but not the input screen page, displays a variable display element, in particular a display wheel or display roller, depending on the substep of an automated multi-step pipetting operation that is currently taking place, as will be explained below.

In particular, by the above definitions, the distinction of the input screen page and the output screen page can be made.

The start of a pipetting operation can satisfy different start conditions or be fixed. It can take place directly by (first) actuation of an actuating element, or, in the sense of a safety query or for other reasons, in a second actuation immedi-ately following this first actuation (i.e. in particular without the special button having been touched), or possibly a third actuation of an actuating element can take place, which is different from the touchscreen. The data processing device is preferably programmed to display the input screen page, in particular homescreen, for displaying and entering pipetting parameters of a parameter set of pipetting parameters, and, when the actuation of the at least one actuating element (different from the screen) is detected, to display in the screen, instead of the input screen page, an output screen page (abbreviated: "do") for displaying pipetting parameters of the parameter set defined in the input screen page, and in particular, triggered by this actuation or upon an actuation of one of the actuating elements (different from the screen) following this actuation, to start the pipetting operation, or in particular, if this actuation of the at least one actuating element causing the display of the output screen page is detected or upon the actuation of one of these actuating elements following this actuation, to start the pipetting operation defined according to this pipetting parameter set. The data processing device is preferably programmed so that said start conditions are selectable by the user at the pipetting device via an input interface of the GUI.

The input screen page preferably differs from the, in particular each, output screen page, preferably in its graphi-cal representation; in particular, the output screen page has a different color scheme and/or different arrangement of markings and/or information fields. In particular, the output screen page will display different contents, preferably depending on the sub-step of an automated multi-step pipetting operation currently taking place, in particular the values of the pipetting parameters currently defining the sub-step, e.g. the dispensing of a sub-volume Vt at a specific dispensing speed v2 as sub-step i of a total of N steps of the pipetting operation. This may be the case, for example, in the "Dis" application scenario. The concept of distinguishing between an input screen page and an output screen page, which is implemented in particular by means of an external distinguishability, forms a significant ergonomic advantage in operation, since the user recognizes with the least effort whether he is currently in a pipetting operation—possibly interrupted, waiting for an actuation—or in a setting mode. Accordingly, the concept of the input screen page and the output screen page implies such an input mode and output mode of the pipetting device that are easily distinguishable by the user. Preferably, only touching the separate input area—or a completed pipetting operation, which may cause an automatic return to an input screen page, in particular home screen—allow the user to make a change of parameter values or to make a parameter selection again. This sepa-ration especially prevents accidental changing of parameter values while the "do" mode is running, which could possibly destroy a lab work and cause considerable loss of value. On the other hand, the change from "set" to "do" mode by pressing the actuating element means considerable conve-nience for the user and is intuitively understandable. This also contributes significantly to ergonomics and an efficient workflow.

The at least one actuating element is in particular not part of the touch-sensitive screen. The at least one actuating element is preferably designed as a push button, namely as a component which can be actuated by the user and which can be actuated in particular with the thumb when the user holds the hand-held pipetting device in the intended manner with one hand, in that the hand grasps the housing which serves in particular as a handle and in this case in particular a hand support of the housing rests on an index finger. The touchscreen is operated in particular by a finger of the hand that is not holding the pipetting device.

The data processing device may be programmed so that actuating an ejector button (for ejecting a pipette tip) of the pipetting device while an output screen page is displayed, i.e. in particular in the output mode of the pipetting device, results in some scenarios or in principle in the input screen page, in particular homescreen, or another input screen page being displayed instead of the output screen page and/or the pipetting operation being stopped or aborted.

A pipetting program defined by the pipetting parameters of a parameter set can have several temporal phases, e.g., if certain step sequences or substeps are repeated repetitively or cyclically. For example, if a pipetting operation includes 10 step sequences, then the output screen preferably indi-cates which of the 10 step sequences is currently being executed and/or how many remaining step sequences remain for each executed step. In addition, the pipetting parameter(s) of the current (active) step may be displayed. The output screen preferably displays the active parameter settings so that it is clear what will happen next when the actuating element is pressed, e.g. pipetting step 3 of 3 with 150 µL and speed X.

Preferably, the output screen page displays different contents, in particular the values of the pipetting parameters defining the currently running sub-step, e.g. the dispensing of a sub-volume Vt at a specific dispensing speed v2, as sub-step i of a total of N steps of the pipetting operation, depending on the sub-step of an automated multi-step pipetting operation currently taking place. This may be the case, for example, in the "Dis" application scenario.

To indicate the progress of the multi-step pipetting operation, the output screen page preferably has a display element, in particular a single-part or multi-part output tile. The display element shows, preferably depending on the sub-step of an automated multi-step pipetting operation currently taking place, various contents, in particular the values of the pipetting parameters that define the sub-step currently taking place. In particular, the display element occupies an area of the output screen page that changes in size or remains constant.

Preferably, the first view of the display element in a first state, in which it displays the sub-step i (i is a counting index counting the sub-steps running in particular sequentially), differs from a second view in a second state, in that it displays the sub-step i+1. The difference of the view may be that in the first state a counting index i and in the second state a counting index i+1 is displayed in the output screen page, in particular in the display element. Furthermore, the difference of the view may be that in the first state and in the second state different values of pipetting parameters are displayed in the output screen page, in particular in the display element, which are applied in the respective substep.

Preferably, the display element has a first output tile in which one or more values of one or more pipetting parameters are displayed that will be used in the currently running sub-step i. Preferably, the display element also has a second output tile in which one or more values of one or more pipetting parameters are displayed that will be used in the future substep i+1. This gives the user a better overview and control of the work with the pipetting device. Preferably, the display element has another second output tile or a third output tile in which one or more values of one or more pipetting parameters are displayed that were applied in the previous sub-step i−1. This also gives the user a better overview and control of the work with the pipetting device. Analogously, further output tiles with successively planned future substeps (e.g. i+2, i+3, etc., until i=N) can be displayed at least partially and simultaneously. Analogously, further output tiles with successive past substeps (e.g. i−2, i−3, etc., up to i=0) can be displayed at least partially and simultaneously.

The display element may include, particularly depending on substep i, the first output tile and one or more of the second and/or third output tiles.

Preferably, at least during a sub-step i, the display element comprises said first output tile, said second output tile, and said third output tile. Preferably, said first output tile is spatially arranged between said second output tile and said third output tile. In this arrangement, the display element is also referred to as the display wheel or display roller. Preferably, the display roller has at least three positions (e.g., center, left, right; or: center, top, bottom) that can be occupied by output tiles identifying a respective substep. The progress of the multi-step pipetting operation, counted by the index counter i, is illustrated by a rotation of the output tiles of the display roller, since, for example, in a ten-step (N=10) pipetting operation (e.g. dispensing process), at the beginning of the pipetting operation (i=1), the output tile associated with sub-step i=1 is located in the middle roller position, while an output tile associated with sub-step i=0 does not exist; or exists and is displayed laterally (left, right, up, down) of the middle position and displays information about the entire pipetting operation or other or no information; and while the output tile associated with future sub-step i=2 is located laterally of the middle roller position and opposite the first position (e.g., right, left, down, up). Upon completion of sub-step i=1, the first output tile changes from the center position to a lateral position and the second output tile pertaining to the now-expiring sub-step i=2 changes to the center position, while the third output tile pertaining to the now-future sub-step i=3 is newly displayed in the other lateral position of the display roller.

Preferably, a progress indicator is displayed in the output screen page, in particular in the display element, in particular in at least one output tile of the display element, which contains information about the progress of the multi-step pipetting operation. In particular, the counting index i and additionally the value N of the total number of partial steps of the multi-step pipetting operation can be displayed, for example in the form of a text output "i of N" or "i/N". The progress indicator can additionally or alternatively include a non-numerical and graphical representation of the progress, in particular a progress bar, or a line representing the successively running substeps 1 . . . N with the position of the currently running substep i graphically highlighted.

If a display element comprises several output tiles depending on the substep, as for example in the case of a display roller, provision can be made for animated display of the change from the first view to a second view of the display element. In addition, the lateral positions of a display roller may be displayed shaded or brightened, in particular to simulate or display a three-dimensional object (roller, wheel), and/or to simulate or display perspective. This makes working with the pipetting device even more intuitive.

Preferably, the data processing device is programmed to ensure that the pipetting device has precisely one first and one second actuating element, which can be actuated separately from one another, in particular by means of an operating rocker. Independently of this, an ejector button can be provided for ejecting a pipetting container, in particular a pipette tip. This makes operation intuitive and ergonomic.

The data processing device is preferably programmed to detect the actuation of an actuating element, in particular the first actuating element, by the user and to start the pipetting operation defined according to the parameter set as a function of the actuation of the actuating element. It is possible for the pipetting operation to start immediately after the actuation of the actuating element, or for one or two intermediate processes to take place before the start, e.g. a blow-out, i.e. ejection of the residual liquid in a pipetting container by means of an overstroke, or prewetting of the pipette tip by picking up and dispensing a prewetting volume of the sample one or more times before the start of the further steps of the pipetting operation, or a mixing step can take place which provides for the picking up and dispensing of a mixing volume before the start of the further steps of the pipetting operation.

Preferably, the pipetting device comprises a first and a second actuating element, each of which are separately arranged buttons. Preferably, the pipetting device comprises an operating rocker, and a first and a second actuating element that are separately actuatable by the operating rocker in that pressing a first pressure surface of the operating rocker actuates the first actuating element and pressing a second pressure surface of the operating rocker actuates the second actuating element, the first and second pressure surfaces being haptically distinguishable. In particular, the first and second pressure surfaces may be distinguishable with respect to the following haptically perceptible and distinguishable external features: * the direction of optional curvature of the first and second pressure surfaces, particularly in that the first pressure surface is concave and the second pressure surface is convex; * the surface textures of the first and second pressure surfaces; * the materials of the first and second pressure surfaces. In predetermined situations of operation of the pipetting device, for example after starting an execution mode by pressing one of the actuating elements in the setting mode, the first actuating element may in particular cause the sample to be picked up, and the second actuating element may in particular cause the sample to be dispensed. Alternatively, the second actuating element may in particular cause the sample to be picked up, and the first actuating element may in particular cause the sample to be dispensed Preferably, the pipetting device comprises a housing which is arranged as a handle for holding the pipetting device with a single hand of the user and which comprises an axial portion containing the piston, along the longitudinal axis A of which the piston extends, and wherein the pipetting device has a first and a second actuating element which can be actuated separately from one another by an operating rocker which is mounted on a plate surface of the pipetting device, in particular a thumb support surface, which is arranged at an angle $80 < \alpha < 180°$ to the longitudinal axis and which preferably slopes downwards. The "downward" direction refers to the direction of gravity when the longitudinal axis of the pipetting device is arranged parallel to gravity. In particular, the plate surface is arranged in such a way that the user's thumb rests on the thumb support surface essentially without fatigue ("sweet spot" of the gripping hand) when holding the pipetting device with one hand.

Preferably, the pipetting device comprises a housing that has plastic or is made of plastic.

Preferably, the plateau surface is perpendicular to a plane passing through the longitudinal axis and perpendicular to a surface of the screen.

Preferably, the pipetting device comprises a housing having an axial portion containing the moving member, in particular a piston or a piston rod, along the longitudinal axis of which the moving member extends, and a head portion having a front surface inclined with respect to the longitudinal axis, which front surface is formed by the surface of the screen and preferably a frame enclosing the screen, the screen occupying at least 70%, preferably at least 80% or even at least 90% of the front surface; and wherein in particular a frame front surface lies in a first plane and the screen lies in a second plane identical to or parallel to the first plane.

Preferably, the pipetting device has a housing with a connecting section for at least one pipetting container and with an ejector button, the contact surface of which can be moved along a path into the housing by pressing the ejector button, wherein the pipetting device is set up so that when the end of this path is reached, the at least one pipetting container, in particular the pipette tip, is ejected, or so that an electrical signal is generated which triggers the ejection of the at least one pipetting container, in particular the pipette tip. The ejector button may be spring-loaded. The ejection can also be purely mechanical, in which case the energy required for ejection is applied by the user, directly during ejection or indirectly by tensioning a spring element when the pipette tip is attached.

The invention also relates to a system for inputting pipetting parameters, comprising the hand-held pipetting device according to the invention, and an external data processing device, in particular a smartphone or tablet PC, comprising an external screen, i.e. a screen which is not part of the pipetting device, and data processing device programmed to display in the external screen an external input screen page ("set") for displaying and inputting the pipetting parameters of a parameter set of pipetting parameters, wherein the external input screen page and the input screen page of the pipetting device are substantially the same in terms of content, i.e. the same functionality is provided by the external input screen page, in particular the input screen page of the pipetting device i.e. the same functionality we have the screen page, in particular the input screen page of the pipetting device, wherein the system comprises to transmit the pipetting parameters defined on the external data processing device to the pipetting device and use them there to define a pipetting operation, and or to transmit the pipetting parameters defined on the pipetting device to the external data processing device and store them there.

The invention also relates to a computer program code for providing an input screen page on the screen of a hand-held pipetting device which is for pipetting at least one liquid sample and which comprises a connecting section for connecting at least one pipetting container, an electrically controlled moving member, in particular a piston, a piston rod or other element, for aspirating the at least one sample into the at least one pipetting container, for holding the sample in the at least one pipetting container and for dispensing sample from the at least one pipetting container when performing a pipetting operation, and a touch-sensitive screen for inputting the parameter values of user-definable pipetting parameters, wherein a parameter set of pipetting parameters completely defines the pipetting operation, and wherein the pipetting device has an electrical control device with a data processing device which is programmed to control the moving member as a function of the at least one pipetting parameter, and at least one actuating element which can be actuated by a finger pressure, in particular thumb pressure, of a user and whose actuation starts the pipetting operation defined according to the parameter set, wherein the program code, when executed by the data processing device of the hand-held pipetting device, results in a) an input screen page ("set") for displaying and entering pipetting parameters of a parameter set of pipetting parameters is displayed in the screen, b) when the actuation of the at least one actuating element is detected, an output screen page ("do") for displaying pipetting parameters of the parameter set is displayed in the display screen, and optionally: upon this actuation or a subsequent actuation of an actuating element, the pipetting operation is also started according to the current pipetting parameter set, and c) a special button is displayed in the output screen page, touching it causes closing the output screen page and displaying the input screen page in the screen, or wherein the program code, when executed by the data processing device of the handheld pipetting device, results in that a graphical user interface (GUI) is displayed in the screen, the GUI including at least the following: Display of a screen page, in particular a home screen, in the screen, in which pipetting parameters of a parameter set of pipetting parameters are displayed, wherein the screen page includes at least a first input tile which displays the value of at least a first pipetting parameter of a parameter set, in particular a base parameter set which defines a pipetting operation, in particular a basic pipetting operation, and touching of which opens an input interface which allows the user to enter the value of the at least one first pipetting parameter, the screen page having at least one input field, the touching of which enables the selection of at least one second pipetting parameter by the user, wherein the data processing device is programmed, after detection of this user-activated selection, to add the at least one second pipetting parameter to the at least one first pipetting parameter of the parameter set, in particular of the base parameter set, to form with this at least one first pipetting parameter the pipetting parameters of a user parameter set defining a user-defined pipetting operation, and this selection of the at least one second pipetting parameter is displayed to the user in the screen page, in particular homescreen.

The pipetting device or an external data processing device preferably have a data storage device. This preferably has at least one data memory, in particular a hardware data memory, in particular non-volatile data memory, in particular an EPROM or FLASH memory. It may also have a volatile data memory.

The electrical control device of the pipetting device or of an external data processing device, also abbreviated as control device or control device, preferably has a data processing device, which in particular has at least one central processor (CPU). The data processing device may include a microcontroller. The control device preferably comprises a microcontroller. The control device preferably has at least one memory device or data memory for storing data, in particular pipetting parameters and/or one or more computer programs or computer program codes.

The control device preferably includes at least one control software or control program which uses this at least one pipetting parameter to automatically execute at least one function of the pipetting operation or a part of the pipetting operation or the pipetting operation. The control software or the control program is executed in particular by the data processing device of the control device, in particular by a CPU of the data processing device. The control software or the control program is stored in particular in a data storage device of the device. This data storage device is preferably a non-volatile memory.

The pipetting device or an external data processing device may have a sensor device, e.g. a sensor for detecting an environmental parameter, in particular temperature, humidity or pressure, the motor current used to drive the piston of the pipetting device. In particular, the motor current can be used to determine the viscosity of the pipetted liquid, and thus to identify the liquid. The sensor device can also be designed to perform a measurement that can be used to determine a parameter, in particular pipetting parameters, in particular the type of pipetting container connected to the pipetting device, in particular the maximum filling volume of the pipetting container, in particular of a pipette tip. The pipetting device or an external data processing device can be designed to automatically determine at least one pipetting parameter as a function of the measured value of the sensor device. This makes it possible to improve the optimization of the pipetting parameters required for precise pipetting.

The pipetting device and/or an external data processing device is preferably operated independently of the mains. In particular, the respective device may be provided with a rechargeable voltage source, for example one or more rechargeable batteries. For this case, the device may have a charging interface connected to the rechargeable voltage source.

Pipette tips are in particular disposable products and are preferably made of plastic. Depending on the required maximum liquid volume, different pipette tips are used with the piston-stroke pipette. Typical nominal volumes of commercially available pipette tips are, for example, 10 µL, 20 µL, 100 µL, 200 µL, 300 µL, 1000 µL, 1250 µL, 2500 µL, 5 mL, 10 mL (µL: microliter; mL: milliliter). A pipette tip generally has a cone-shaped container elongated along a longitudinal axis, which has a liquid exchange opening at the lower end, and which has a cone- and tube-shaped, upwardly open end section at the upper end, which can be plugged onto a connecting section designed as a working cone of the pipetting device designed as an air cushion pipette, in particular. Suction of the liquid into the pipette tip is effected via a negative pressure in the interior of the pipette tip, which in the case of the pipette device designed as an air cushion pipette is generated by a movement of the moving member of the pipette device designed as a piston, in that a negative pressure is generated in the air space above the sample in the pipette tip. The interior of the pipette tip is fluidically connected to the pipetting channel of the piston-stroke pipette in a pipetting position, also referred to as the push-on position, in which the pipette tip is connected to the connecting section of the piston-stroke pipette, which is acted upon by the negative pressure/overpressure via a cylinder piston of the piston-stroke pipette that can be moved electrically in a hollow-cylinder-shaped piston chamber.

A dispensing tip is used with direct displacement devices in which there is essentially no air cushion between the piston and the liquid sample during pipetting. Here, the piston is part of the dispensing tip. This has a container part acting as a piston cylinder with a container mouth and a container opening in which the piston engages in order to be displaceably arranged in the piston cylinder and to be able to displace the entire aspirated liquid content in a final position. When connecting the dispensing tip to the pipetting device designed as a direct displacement device, the container part is connected to the connecting section of the pipetting device, in particular by screwing it on, and the piston couples to the moving member by means of a coupling device. Dispensing tips are in particular disposable products and are preferably made of plastic. Depending on the required maximum liquid volume, different dispensing tips are used with the direct displacement device. Typical nominal volumes of commercially available dispensing tips are, for example, 100 µL, 200 µL, 500 µL, 1 mL, 2.5 mL, 5 mL, 10 mL, 25 mL, 50 mL.

The invention relates to a hand-held pipetting device, a data processing device cooperating therewith, a system and a computer program or computer program code, which may in particular be stored on a data storage medium. The possible and preferred embodiments of each of these objects result from the description of all embodiments of the respective other objects, in particular embodiments of the hand-held piston-stroke pipette result from the description of the method, the—in particular external—data processing device, the system and the computer program.

Further preferred embodiments of the method according to the invention, the hand-held piston-stroke pipette, the data processing device cooperating therewith, the system and the computer program will result from the following description of the embodiment examples in connection with the figures and their description. Identical components of the embodiments are indicated by substantially the same reference signs, unless otherwise described or otherwise apparent from the context. Showing:

FIG. 1*a* shows a schematic side view of an example of a pipetting device according to the invention, in this case an air cushion pipette.

FIG. 1*b* shows a detail of the operating rocker of the pipetting device from FIG. 1*a*.

FIG. 1*c* shows a view of the pipetting device from FIG. 1*a* rotated slightly about the longitudinal axis A.

FIG. 1*d* shows a perspective side view of a detail of the pipetting device from FIG. 1*a*, with visible touchscreen.

FIG. 1*e* schematically shows a system according to the invention according to an embodiment example.

Figure 2A:
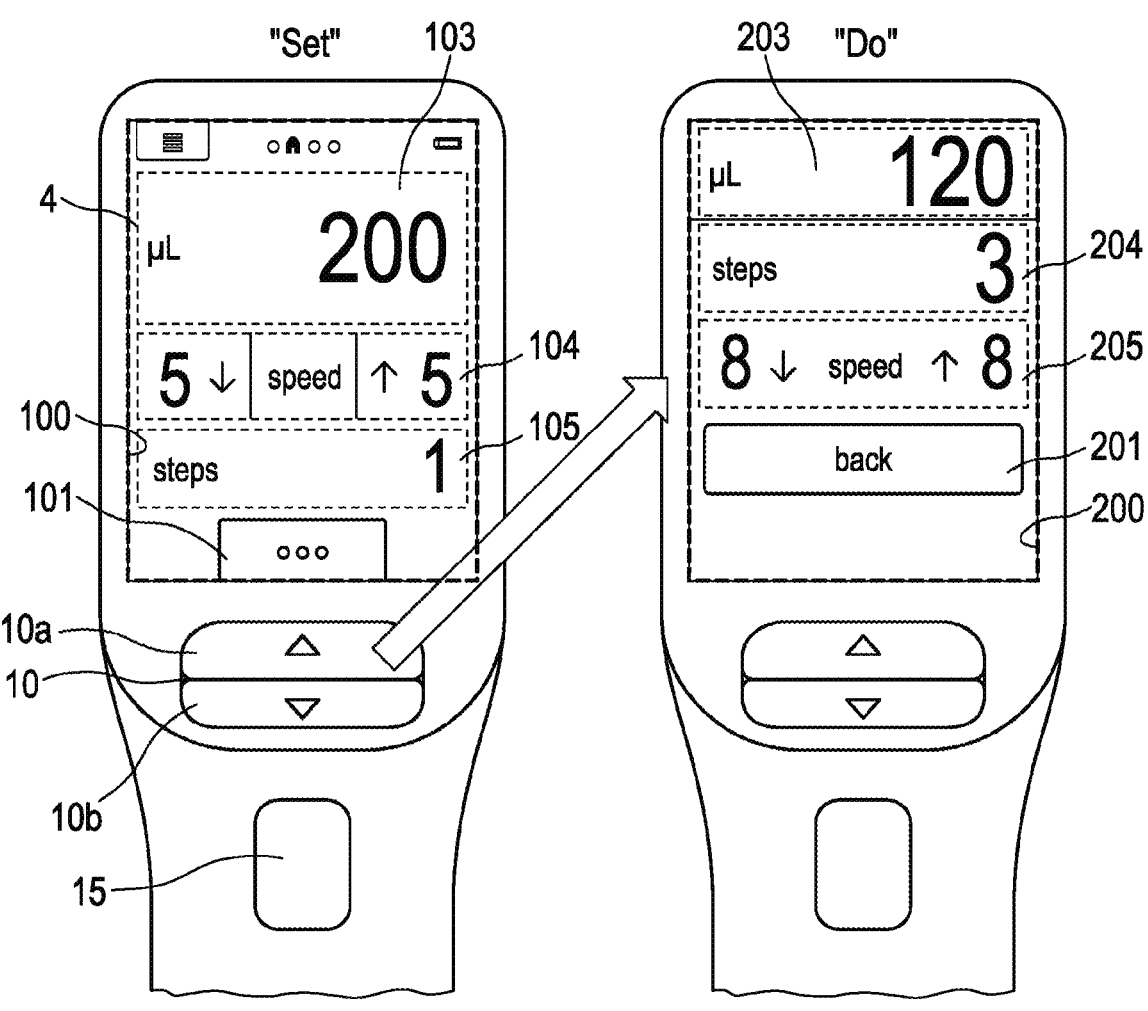

FIG. 2*a* shows, by means of two images of the header area of a pipetting device according to an embodiment of the invention, the functionality of the GUI of the pipetting device to switch between two main types of screen pages, namely between an input screen page and an output screen page.

FIG. 2*b* shows input screen pages of the GUI and below them (symbolically) an actuating element of the pipetting device starting from an input screen page ("set"), which is replaced by an output screen page by actuating the actuating element, which—respectively whose content—changes successively in the dispensing pipetting operation ("Dis") shown here.

Figure 2C:
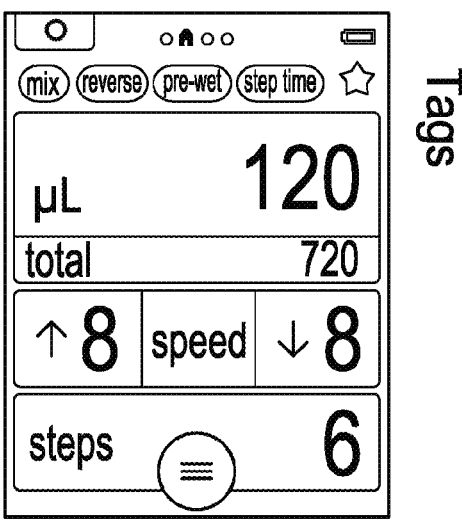

FIG. 2*c* shows an input screen page of the GUI, with a short description list of the currently selected list of pipetting parameters for the pipetting parameter set, where the short description list is implemented in the form of "tags" arranged at the top of the screen, in each of which a short description of the selected pipetting parameters is shown; in this way, the user has the already selected pipetting parameters in view, even if he does not see the entire (scrollable) selection list.

Figure 2D:
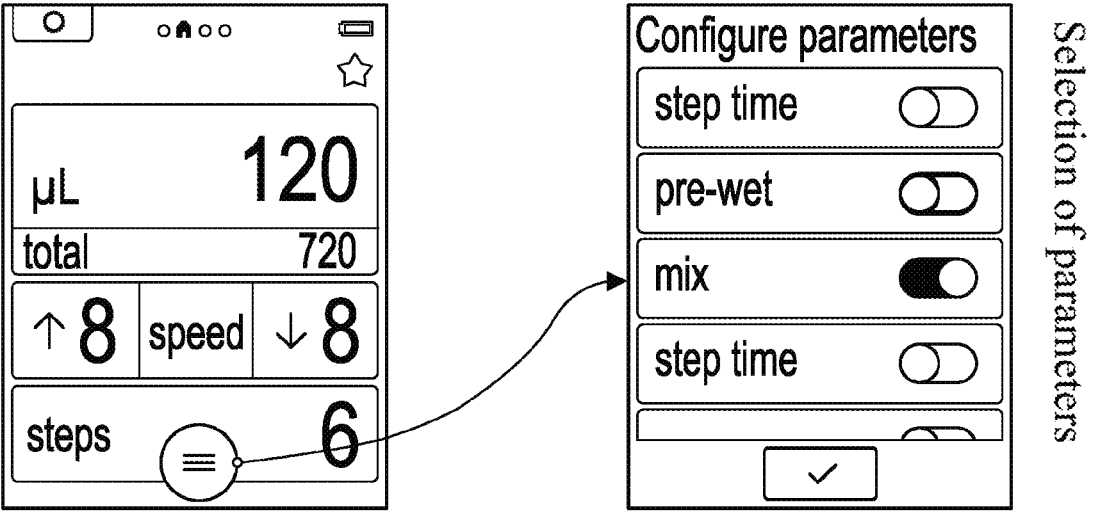

FIG. 2*d* shows an input screen page, in particular home screen, of the GUI and a parameter selection screen page superimposed on the input screen page when a separate input field on the input screen page is touched.

Figure 2E:
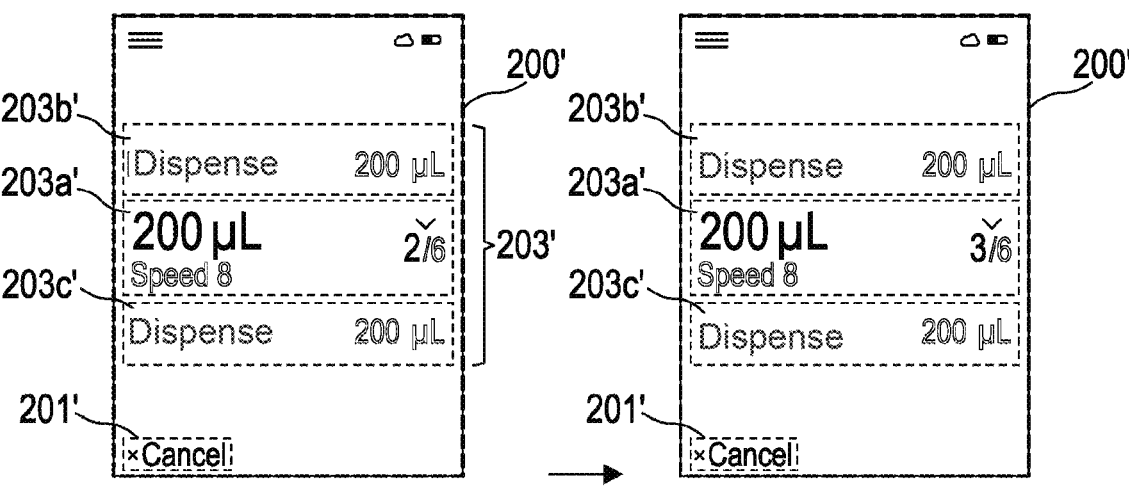

FIG. 2*e* shows an output screen page of the pipetting device according to embodiment, in a multi-step dispensing operation, in a first state in substep i=2 and a second state in substep i=3.

Figure 2F:
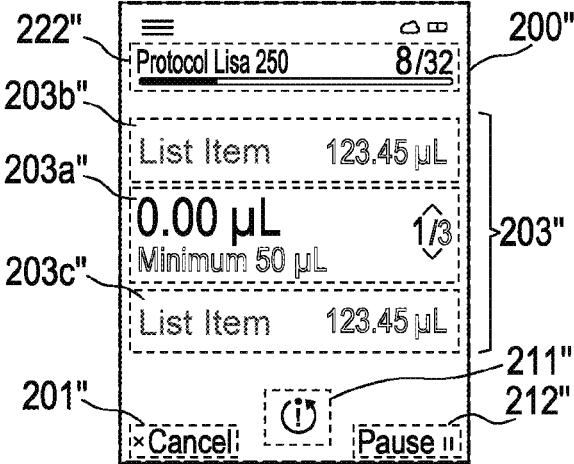

FIG. 2*f* shows an output screen of the pipetting device according to the embodiment of the invention, during a multi-step pipetting operation.

Figure 3A:
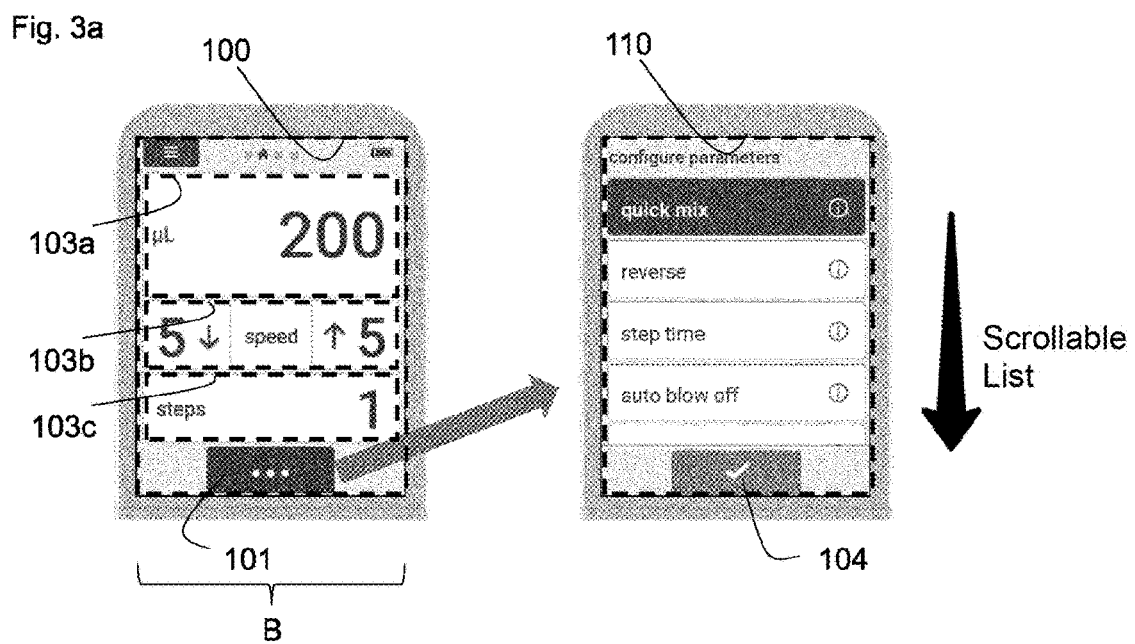

FIG. 3*a* uses two images of the header area of a pipetting device according to the embodiment to show further functionalities of the GUI of the pipetting device, namely starting from a home screen via a selection list in the selection screen to add further pipetting parameters or functions to the current parameter set.

Figure 3B:
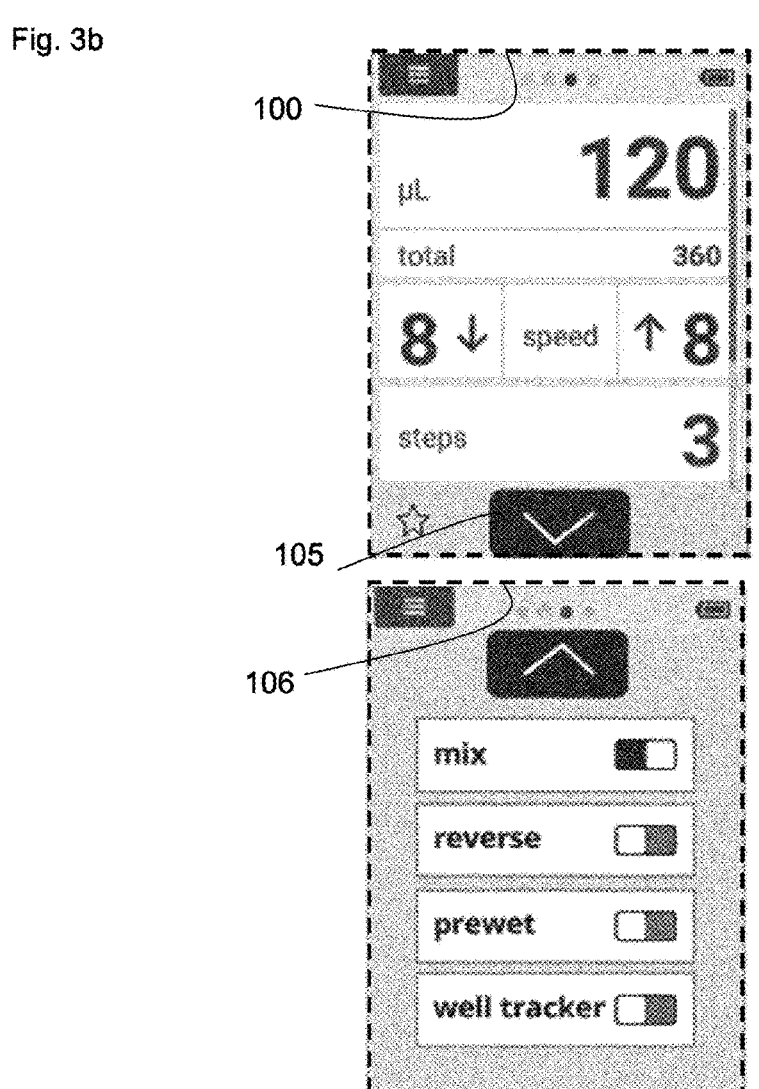

FIG. 3*b* shows two images of a pipetting device according to an embodiment of the invention to illustrate further functionalities of the GUI of the pipetting device, namely adding further pipetting parameters or functions to the current parameter set starting from a home screen with scrollable content or a scrollable selection list.

Figure 4:
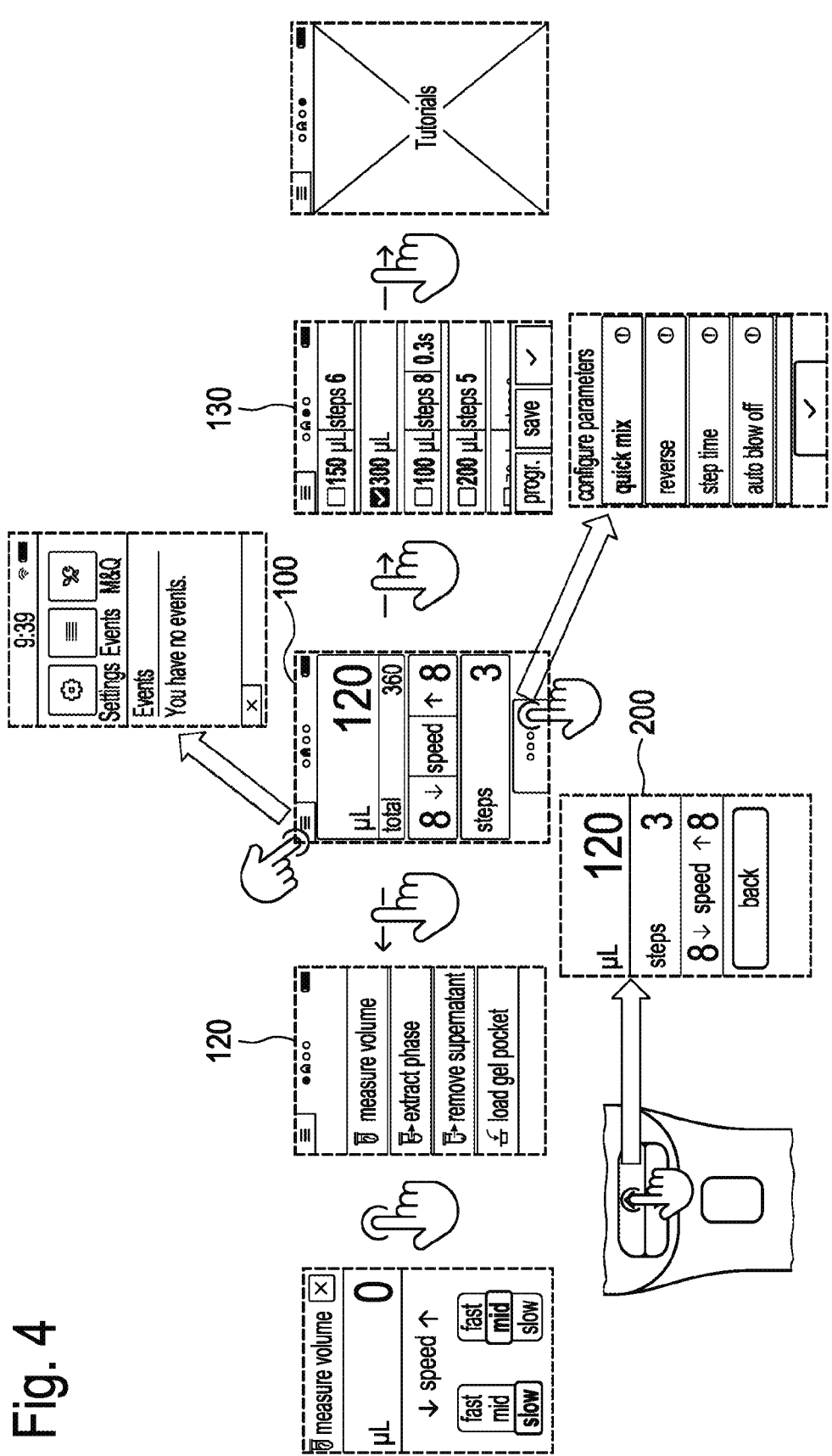

FIG. 4 shows, on the basis of several images of the screen of a pipetting device according to the embodiment, the functionality of the GUI of the pipetting device to switch between the display of different screen pages.

Figure 5A:
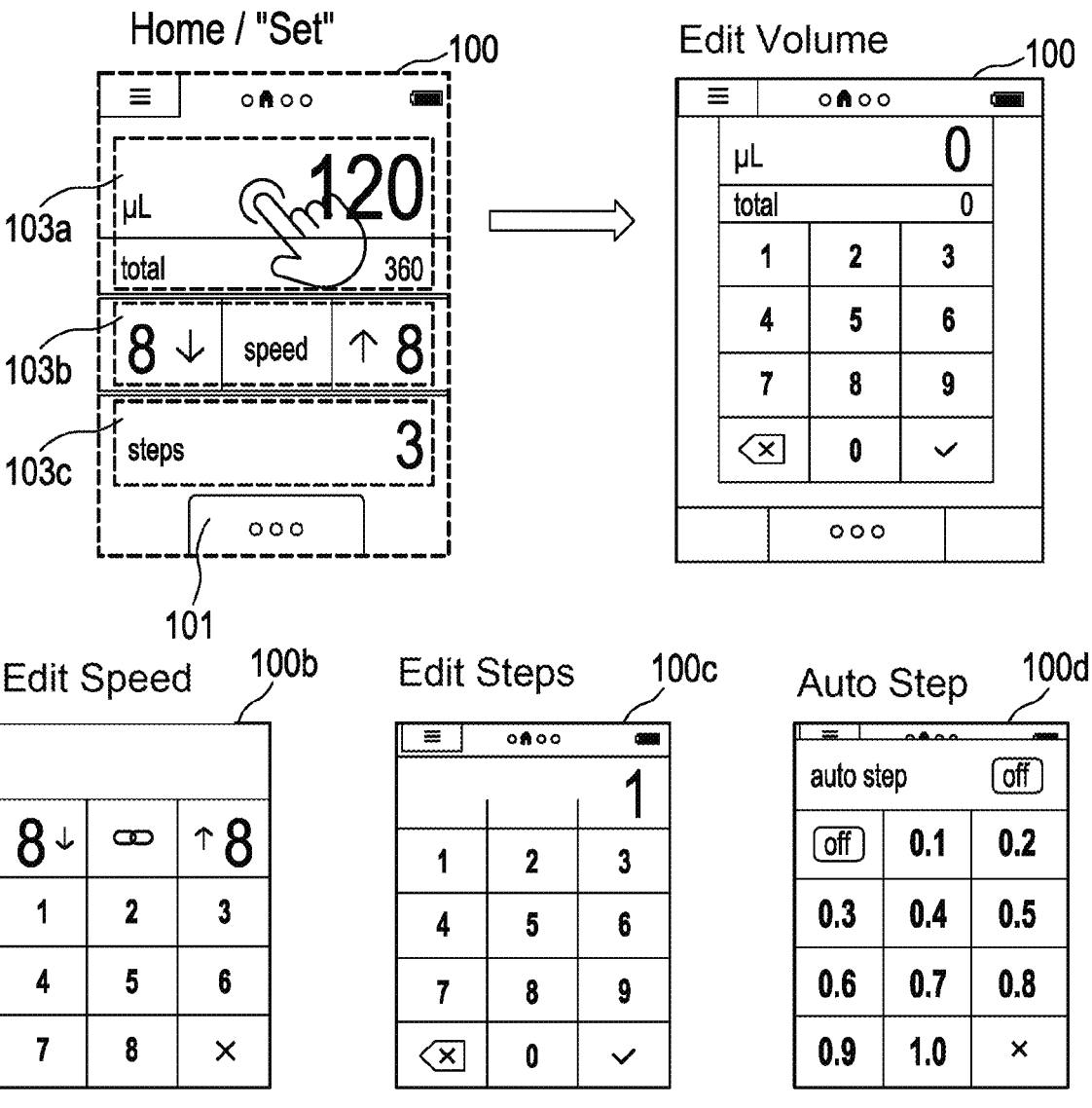

FIG. 5*a* shows by means of several images of the screen of a pipetting device according to the embodiment of the invention the functionality of the GUI of the pipetting device to set pipetting parameter values by means of an input mask.

FIG. 5*b* shows by means of two images of the screen of a pipetting device according to the invention according to an embodiment the functionality of the GUI of the pipetting device to call up a historical list of pipetting parameters or to use an optional menu bar with input fields or, as a navigation aid, information fields not serving as input fields for the input screen page.

FIG. 6 shows, on the basis of several images of the screen of a pipetting device according to the embodiment, the functionality of the GUI of the pipetting device to select predetermined parameter sets representing specific application scenarios.

FIG. 7*a* shows by means of two images of the screen of a pipetting device according to the invention according to an embodiment the functionality of the GUI of the pipetting device to mark a current parameter set as a favorite, which is then stored as a favorite and displayed in particular in a favorite screen page as a selectable list entry, namely as a correspondingly informative input tile.

FIG. 7*b* shows by means of two images of the screen of a pipetting device according to the invention according to an embodiment the functionality of the GUI of the pipetting device, that the input tile identifying a favorite parameter set in the favorite screen page has an input field, the touching of which transfers the parameters of the favorite parameter set to a separate screen, which is then displayed, in which the parameter values and/or the parameter selection of the favorite parameter set can be changed.

Figure 8A:
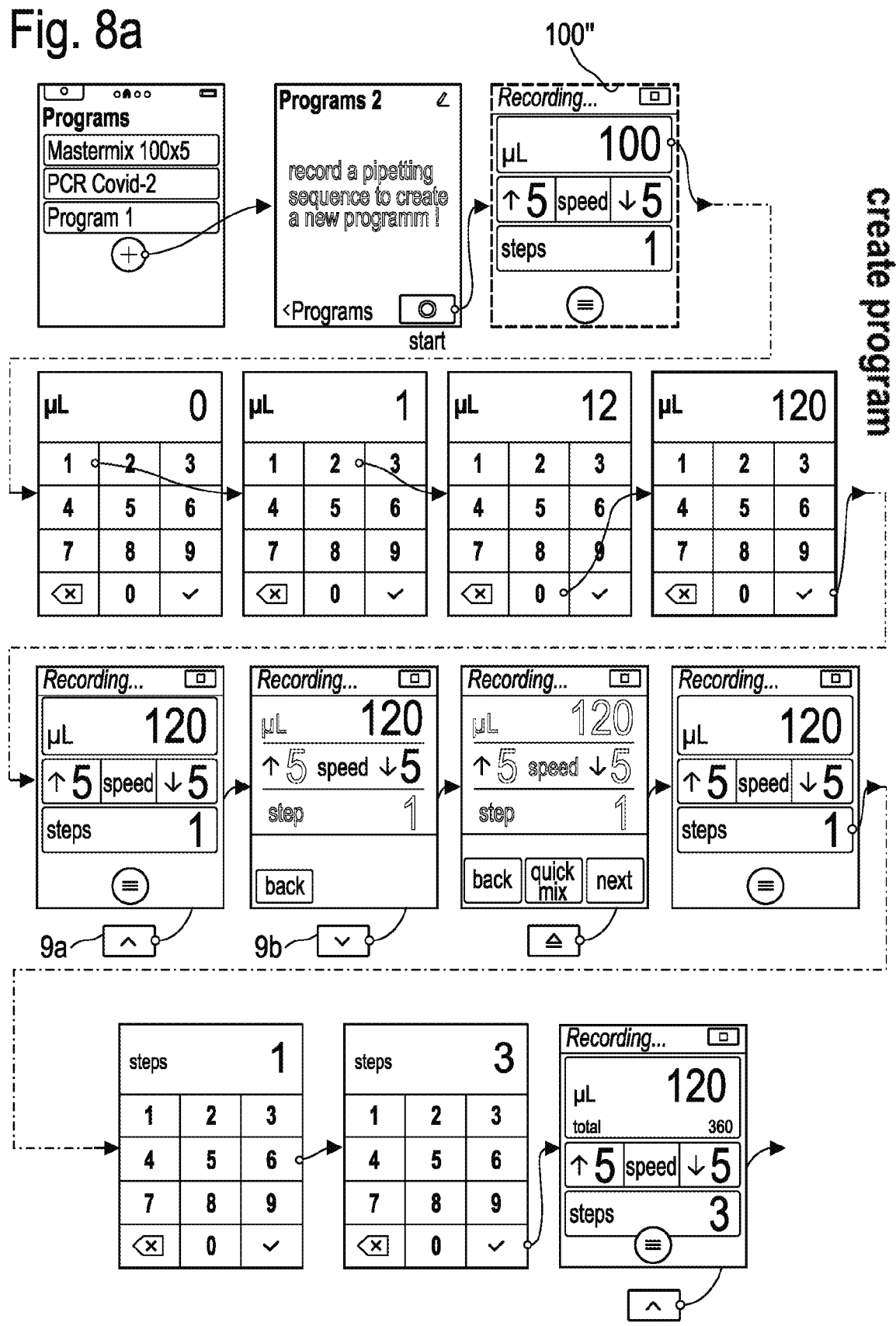
Figure 8B:
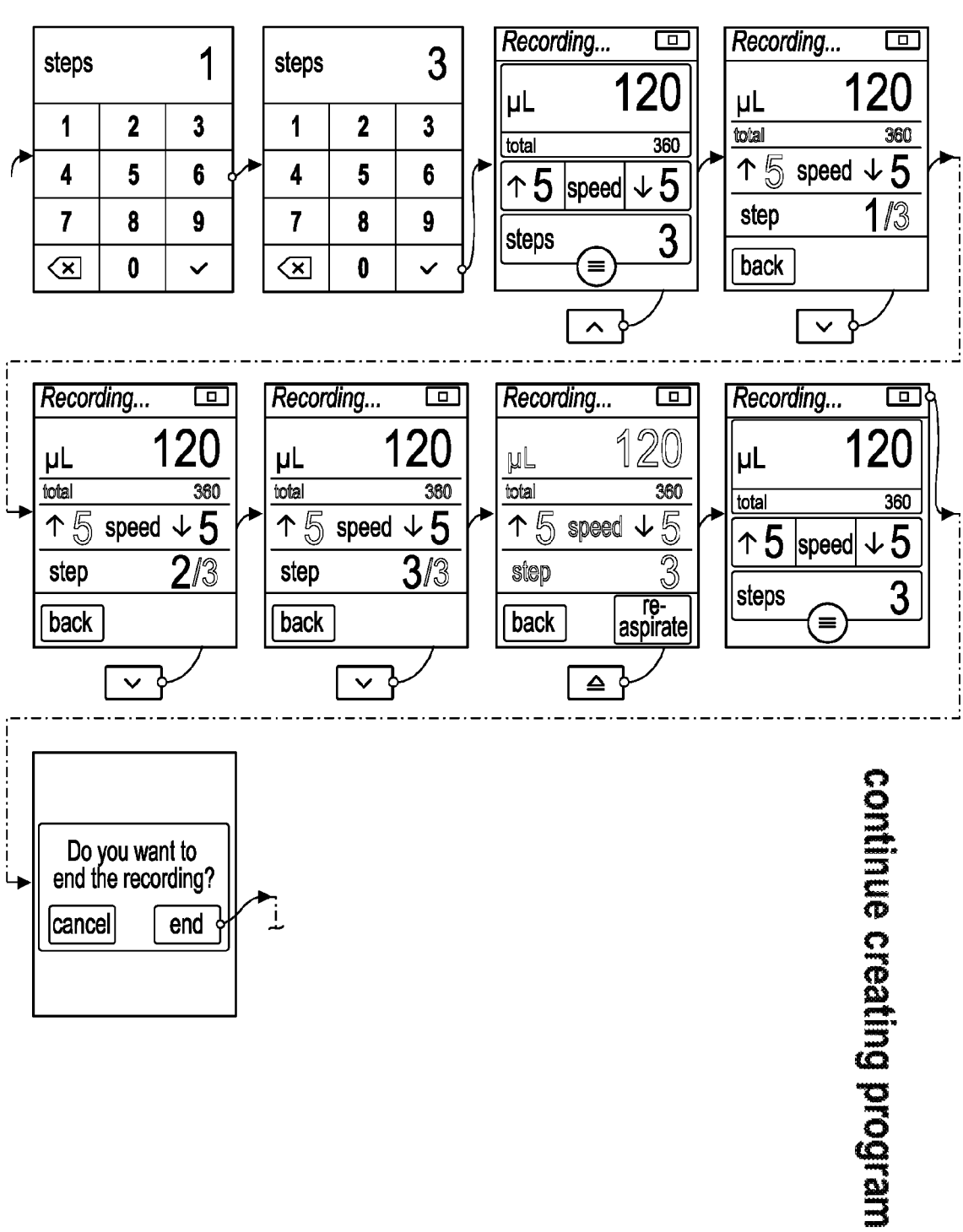
Figure 8C:
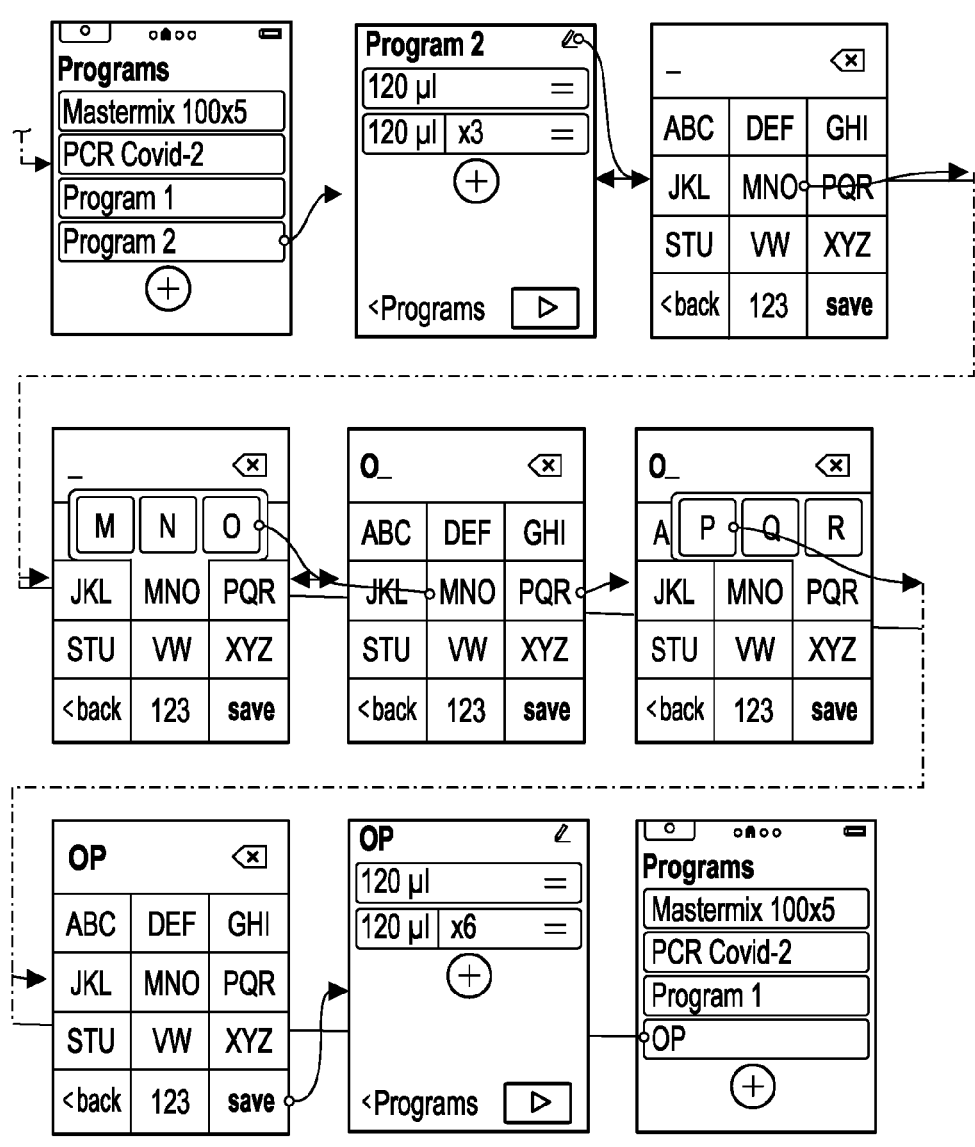

FIGS. 8*a*, 8*b*, and 8*c* belong together and show, by means of a sequence of numerous images of the screen with the actuating element of a pipetting device according to the invention (symbolically) superimposed thereunder, the functionality of the GUI of the pipetting device to define the pipetting parameters of a user-defined pipetting operation by means of a recorder function of the pipetting device.

Figure 9:
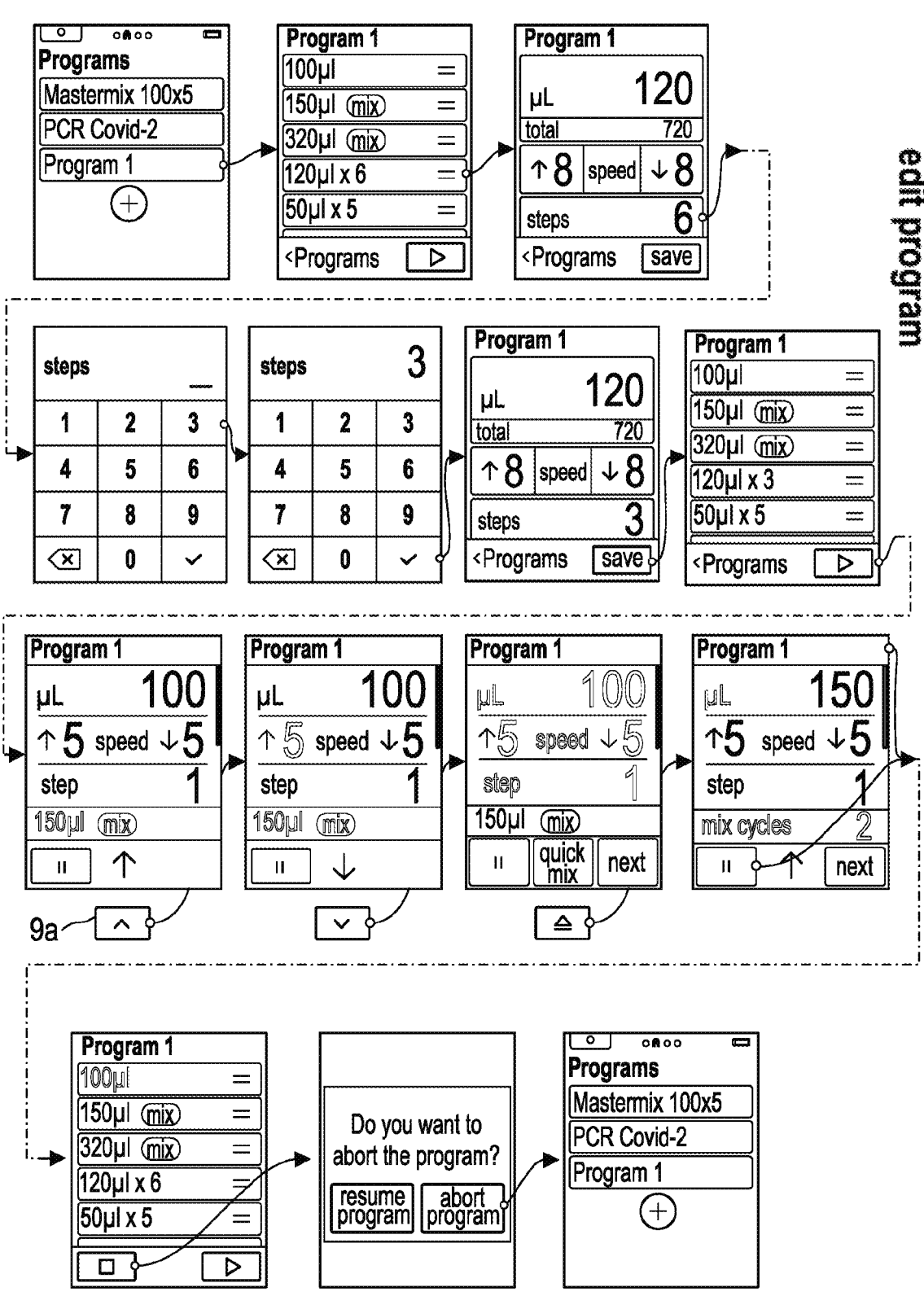

FIG. 9 shows, on the basis of a sequence of numerous images of the screen with the actuating element of a pipetting device according to the invention (symbolically) displayed below it, the functionality of the GUI of the pipetting device to select a parameter set created in a user-defined manner by means of the recorder function and to edit it for modification purposes.

FIG. 1*a* shows the hand-held pipetting device according to the invention for pipetting at least one liquid sample, in this case an air cushion pipette 1, comprising: a connecting section 2 for connecting at least one pipetting container 19, in this case a pipette tip, with a moving member electrically controlled by the control device 5, in this case the piston 3, for aspirating the at least one sample into the at least one pipetting container 19, holding the sample in the at least one pipetting container and dispensing sample from the at least one pipetting container when carrying out a pipetting operation, with a touch-sensitive screen 4 on the front surface 14*a* of the head section 14 of the pipetting device, for inputting the parameter values of user-definable pipetting parameters, wherein a parameter set of pipetting parameters completely defines the pipetting operation, wherein the electrical control device 5 comprises a data processing device 6 programmed to control the moving member 3 in response to the at least one pipetting parameter, and comprises a data memory 7 and a communication unit 8 for wireless communication with an external data processing device, with exactly two actuating elements (synonymously: actuating elements) 9a and 9b, which can be actuated by the user by means of an operating rocker 10. Each of these actuating elements can be actuated to move the pipetting device from an input mode ("set"), in which an input screen page 100, 100' is shown in the screen, e.g. the home screen shown in FIG. 1d, to an output mode ("do"), in which an output screen page is shown in the screen. This advantageous aspect of the operating concept is also explained with reference to further FIGS. 2a, 2b and 4. In contrast, actuation of the ejector button 15 and a (not shown) "power on/off" button of the pipetting device do not cause the change between "set" and "do" mode. The list of pipetting parameters belonging to the parameter set can be edited by means of the input field 101', also referred to as "extra button", which is provided with a "+" sign in FIG. 1d.

The operating rocker comprises a lower section 10b, which is concave and whose actuation activates the button 9b and, in particular, effects a sample delivery, and an upper section 10a, which is convex and whose actuation activates the button 9a and, in particular, effects a sample pick-up. The operating rocker sits on a plateau formed by a housing section which makes an angle of approximately α=130-140° with the longitudinal axis A of the pipetting device. Due to the hand support 16 arranged perpendicular to the longitudinal axis adjacent to the plateau, the pipetting device fits ergonomically in the hand and the thumb can rest on the rocker 10 at rest, since the hand position allows the thumb to rest on a "sweet spot" of the hand. The screen 4 is disposed in a head housing portion 14 of the pipetting device.

The pipetting device comprises an electric motor 18 which is powered by an accumulator 17 and which moves the piston rod or piston 3 within the cylinder piston 12 so that an aspiration pressure or a dispensing pressure is the result in the pipetting channel 13. Precise dispensing can be achieved by means of the electronic control system. An ejector button 15 is provided to allow ejection of the pipette tip 19 from the connecting section 2 by means of an ejection sleeve of the pipetting device. In particular, the data processing device is programmed to abort an ongoing pipetting operation in the event of actuation of the ejector button 15 and to replace any output screen page still displayed by an input screen page 100, 100'.

An actuation of any of the two actuating elements 9a, 9b by the user would start the pipetting operation defined according to the current parameter set. The selection of the pipetting parameters of a parameter set which defines the desired semi-automated pipetting operation and the setting of the values of these pipetting parameters is performed by means of a GUI which implements the particular operating concept according to the invention. This operating concept is explained with reference to the following figures.

The data processing device 6 is programmed (see FIG. 2a) to display in the screen 4 an input screen page 100, 100' ("set", see contents of the rectangle enclosed by the dashed line) for displaying and inputting pipetting parameters of a parameter set of pipetting parameters, and, when an actuation of at least one of the actuating elements 9a or 9b is detected, to display in the screen 4 an output screen page 200 ("do") for displaying pipetting parameters of the parameter set defined in the input screen page, and furthermore, when this actuation of the at least one actuating element is detected or during the subsequent actuation (in the sense of an optional safety query) of one of these actuating elements, to start the pipetting operation defined according to this pipetting parameter set, wherein the output screen page 200, or another output screen page displayed after the output screen page 200, has an input area designed as a special button 201 (here labeled with the information "back"), here at the lower screen edge, the touching of which causes the closing of the output screen page 200 and the display of the input screen page 100 or another screen page, in particular input screen page, in the screen 4. In particular, a second actuation of one of the actuating elements 9a, 9b (different from the screen) following this first actuation starts the pipetting operation defined according to the current pipetting parameter set.

The other screen page mentioned can in particular enable editing of parameter values contained in the pipetting parameter set. It does not have to be exactly the previous input screen page 100 if, for example, only the speed is to be quickly adjusted when the pipetting sequence ("do") has already started. It can be provided that also not all parameter values can be changed/corrected after the pipetting operation has started, but only certain parameter values of the current pipetting parameter set.

The input screen page 100 and the output screen page 200 differ in their graphical and/or textual or numerical reproduction, in particular in the color scheme: the input fields of the input screen page 100 are largely kept with black information (letters, numerical values, input field color) on a light or white background, and the display fields of the output screen page 200 are largely kept with blue information on a light or white background. The black input field 101 (also referred to as the extra button) of the input screen, which calls up the selection screen for selecting pipetting parameters, does not exist in the output screen page.

In particular, the output screen 200 will display different contents, preferably depending on the substep of an automated multi-step pipetting operation currently taking place, in particular the values of the pipetting parameters currently defining the substep, e.g. the dispensing of a subvolume Vt at a specific dispensing speed v2 as substep i of a total of N steps of the pipetting operation. This may be the case, for example, in the "Dis" application scenario shown in FIG. 2b.

In FIG. 2b, first of all, an input screen page 100_1 is displayed which contains the pipetting parameter set of a dispensing process running in a partially automated manner; the extra button 101_1, which is graphically slightly modified here compared to the extra button 101, enables the pipetting parameter list to be edited in an analogous manner, so that according to the invention the screen page has an input field, namely here the extra button, the touching of which enables the selection of at least one second pipetting parameter by the user. The actuation of the actuating element, namely here of the switch 9a or first pressure surface 10a of the operating rocker 10, leads the pipetting device from the "set" mode to the "Do" mode, the output screen page 200_1 is now displayed, which contains the special button 201_1, which is graphically modified with respect to the special button 201 and otherwise acts analogously. After an executed aspiration process, e.g. after a period of 2 seconds here, in which the sub-step of aspirating 360 μl of solution into the pipetting container is executed, the output screen page 200_1 displays the output screen belonging to the sub-step of dispensing the first dispensing sub-volume of 120 μl. An actuation of the actuating element, in this case the second pressure surface 10b of the operating rocker 10, initiates the dispensing of the partial volume, each further actuation of the pressure surface 10b leads to the next dispensing substep. The dispensing substeps are counted through by index counter i=1 . . . 3, the progress display i/N (i=1 . . . 3: N=3) shows the progress of the semi-automatic dispensing process in an output field on the output screen page. To make the progress even more intuitive for the user to understand, a variable display element can be used, e.g., the display roller shown in FIGS. 2*e* and 2*f*. The output screen page 200_1 does not have such a changeable display element, the output tiles are here always at the same position of the output screen page 200_1, only the numerical display of the parameter values changes as well as the progress display.

FIG. 2*e* shows an output screen page 200' of the pipetting device, in a multi-step dispensing operation, in a first state in sub-step i=2 (left side of the figure) and a second state in sub-step i=3 (right side of the figure). The dispensing screen has a variable display element 203', which is implemented as a display roller. In the case of a variable display element comprising at least one output tile, in particular the position of at least one output tile within the display element changes. The display roller 203' has a central output tile 203a' that displays the pipetting parameter "partial dispensing volume" with the value 200 µl of a (N=6)-step dispensing process, the dispensing speed "8" and a numerical progress indicator ("2/6"). Above adjacent to the center dispensing tile 203a' is displayed the top dispensing tile 203b' which displays "Dispense 200 µl" of the previous dispensing sub-step (i=1), and below adjacent to the center dispensing tile 203a' is displayed the bottom dispensing tile 203c' which displays "Dispense 200 µl" of the dispensing sub-step (i=3) immediately following the current sub-step i=2. On the right side in the picture, the same output screen 200' is shown, which is displayed during the next dispense sub-step with i=3. Above adjacent to the center output tile 203a' is displayed the top output tile 203b' which displays "Dispense 200 µl" of the previous dispense sub-step (i=2), and below adjacent to the center output tile 203a' is displayed the bottom output tile 203c' which displays "Dispense 200 µl" of the dispense sub-step (i=4) immediately following the current sub-step i=3. The transition of the view of the display element 203' from i=2 to i=3 (left to right) may be animated to illustrate the dynamics of the progress. The changing display element makes the perception of the multi-step pipetting operation and the operation of the pipetting device more intuitive. In the case of the last partial dispensing step (i=N; here i=6), either information about reaching the end or other information is displayed in the lower position 203c' of the display roller, nothing is displayed, or the corresponding output tile 203c' is then not displayed at all. Analogous can be provided in the first partial output step i=1 for the upper output tile 203b', which then e.g. either shows nothing or is omitted.

The display roller here has a horizontal rotation axis, and the position change of the output tiles is in a vertical direction. Alternatively, a vertical rotation axis or oblique rotation axis would be possible.

FIG. 2*f* shows an output screen page 200" of the pipetting device, in a multi-step (M=32) pipetting operation, in a state in sub-step i=8. Here, too, a display roller 203" is shown, which has the middle output position or output tile 203a", the upper output tile 203b" and the lower output tile 203c", which operate analogously to the display roller 203'. In addition, the output screen 200" has further functionality achieved by means of further output fields and input fields. Preferably, an output screen page in particular does not have an input field that shows the value of a pipetting parameter and whose touching would allow changing a pipetting parameter in the next step, as implemented in the present embodiments. In the "Do" mode, which is preferably present during the display of an output screen page, changing pipetting parameters is not possible, and at most is possible via intermediate steps, and not all pipetting parameters of the parameter set are changeable. For example, it may be possible to change the speed of dispensing/aspiration of the liquid during an ongoing multi-step pipetting operation.

The output screen page "200" has an input field arranged at the edge, here at the bottom right, which bears the inscription "Pause" and implements a pause function. Touching this input field pauses the multi-step pipetting operation, here for example after completion of the dispensing sub-step i=1 of N=3, which is at the same time the eighth sub-step of a total 32-step programmed pipetting operation. The input field provided with the exclamation mark and the circulating arrow enables the repetition of a pipetting operation in the event that the eighth sub-step just performed must be repeated, e.g. due to a user error. According to the logic of the GUI, the input fields mentioned are therefore not input fields which show the value of a pipetting parameter and whose touching would enable a pipetting parameter to be changed in the next step.

In these embodiments of the pipetting device, "touching" an input field always results in an immediate effect, i.e., the effect occurs without significant delay and preferably without another screen page being displayed between the time of touching and the time of displaying the effect (e.g., opening an input interface), e.g., as an information page that indicates a delay, also referred to as a "waiting page". However, there may be GUI scenarios in which such an intermediately displayed information page is useful.

As shown in FIG. 2*f*, for a multi-step (here M=32) pipetting operation, a progress bar can be useful to graphically illustrate the progress ("8/32") also displayed numerically here. The note "Protocol Lisa 250" in the output tile 222" indicates that an e.g. individually programmed pipetting operation with the user-defined designation "Lisa 250" is being carried out and simultaneously logged, i.e. stored e.g. in a log file of the pipetting device. As generally provided, the special button 201" leads to closing the output screen page 200". In general, in particular, each output tile is not an input tile, accordingly does not have an input field, the touching of which would result in a function, and accordingly does not allow any input.

The preferably implemented concept of distinguishing between an input screen page and an output screen page, which is implemented by means of an external distinguishability, forms a significant ergonomic advantage in operation, since the user recognizes with the least effort whether he is currently in a—possibly interrupted, waiting for an actuation—pipetting operation or in a setting mode. Accordingly, the concept of the input screen page and the output screen page implies such an input mode and output mode of the pipetting device that are easily distinguishable by the user. Preferably, only touching the separate input area (special button)—or a completed pipetting operation, which may cause an automatic return to an input screen page, in particular home screen—allow the user to make a change of parameter values or to make a parameter selection again. This separation especially prevents accidental changing of parameter values while the "do" mode is running, which could possibly destroy a lab work and cause considerable loss of value. On the other hand, the change from "set" to "do" mode by pressing the actuating element means considerable convenience for the user and is intuitively understandable. This also contributes significantly to ergonomics and an efficient workflow. An output screen page (e.g., 200) is preferably characterized in principle by the fact that the display fields or tiles contained in the output screen page, e.g., the output tile 203, are purely informative, i.e., they do not serve as input fields and touching them does not result in any action, in particular, does not start any input option. This does not apply to a separate control panel of the output screen page, in this case of the special button 201, the touching of which cancels the output mode and leads to the display of an input screen page on the screen and, in particular, can lead to the termination of a pipetting operation or pipetting program that may currently still be running.

The pipetting device 1 has precisely a first 9a and a second actuating element 9b, which can be actuated separately from one another, in particular by an operating rocker 10. The data processing device 6 is programmed to detect the actuation of the first or second actuating element 9a or 9b by the user and to start the pipetting operation defined according to the parameter set.

The pipetting device has the operating rocker 10, and the first 9a and the second actuating element 9b, which can be actuated separately from one another by the operating rocker in that pressing a first pressure surface 10a of the operating rocker 10 actuates the first actuating element 9a and pressing a second pressure surface 10b of the operating rocker actuates the second actuating element 9b, the first and second pressure surfaces being haptically distinguishable. In particular, the first pressure surface 10a is convex (=curved outward), and the second pressure surface 10b is concave. This allows the user to feel the desired actuating element or the desired side (pressure surface) of the operating rocker without visual inspection, and operation is intuitive and ergonomic.

The pipetting device 1 has a housing 11 which is set up as a handle for holding the pipetting device with a single hand of the user, and which has an axial section 11 containing the moving member, along whose longitudinal axis A the moving member 3 runs. The operating rocker is mounted on a thumb support surface arranged at an angle $80 < \alpha < 180'$, namely here preferably $\alpha = 100\text{-}150°$, preferably 130' to the longitudinal axis and in particular arranged inclined downwards. "Downward" refers to an orientation of the pipetting device with the longitudinal axis A aligned vertically and the pipette tip 19 pointing in the direction of gravity. The angular arrangement of the plateau section of the operating rocker results in an ergonomically arranged thumb support surface. The thumb support surface is arranged starting from the longitudinal axis and is in particular perpendicular to a plane passing through the longitudinal axis A and perpendicular to a surface of the planar screen 4. The position of the plateau section, which is at the same height as the hand support in relation to the longitudinal axis, also results in advantageous ergonomics.

The head section 14 has the front surface 14a inclined to the longitudinal axis A, which is formed by the surface of the screen 4 and a frame enclosing it, whereby the screen here takes up about 80% of the front surface; the frame front surface 14a lies in a first plane and the planar screen 4 lies in a second plane identical to the first plane. As a result, even edge areas of the screen can be easily touched by the user, and the available area of the touchscreen 4 can thus be optimally used. At the same time, the screen edges are not exposed and are protected by the frame front surface 14a.

The housing 11 has the connecting section 2 (working cone) for at least one pipetting container 19 and the ejector button 15, the contact surface of which can be moved along a path into the housing by pressing the ejector button, the pipetting device being set up so that when the end of this path is reached the ejection of the pipetting container, in particular of the pipette tip, takes place or so that an electrical signal is generated which triggers the ejection of the at least one pipetting container.

FIG. 5a: The data processing device is programmed to display in the screen a screen page 102 including at least a first input tile 103, here 103a, 103b, 103c, indicating the value of at least a first pipetting parameter (here: 103a: $V = 120 \, \mu l$, 103b: $v = (v1, v2)$ with dispensing speed $v1 = step$ 8, recording speed=step 8; number n of steps $n = 3$) and touching of which opens an input interface which allows the user to enter the value of the at least one first pipetting parameter, this input interface being a screen area in which, in particular, a numeric keypad is displayed, the numeric keys of which can be touched individually and can be used by the user to enter a sequence of digits which defines the value of the at least one first pipetting parameter. The input tiles are here white rectangular areas of the screen, which are recognizable by corresponding drawing or contrasting with the gray background, and extend with their width b over almost the entire width B of the screen 4. This results in advantageous ergonomics. Although this applies to the input tiles mentioned, it need not apply to all input fields of the input screen page, see FIG. 1d. Here, the input interface is the screen area in a new screen page 100a shown on the right in FIG. 5a, which is shown as superimposed on the screen page 100. Similar screen areas 100b, 100c open when input tiles 103b, 103c of the associated pipetting parameters $v = (v1, v2)$ and n are opened. Or correspondingly a screen area with input fields in a list with possible fractions $f = 0.1$ to 1.0, if instead of the absolute number the division of the total volume V (e.g. by dispensing steps into partial steps or partial volumes) is to be set.

FIG. 3a: Particularly preferably, the data processing device 6 is programmed to display in the screen 4 a screen page 100, here implemented as a home screen, for displaying the pipetting parameters of a parameter set of pipetting parameters, wherein the screen page includes at least one first input tile 103 (here three input tiles 103a, 103b, 103c), which displays the value of at least one first pipetting parameter of a base parameter set (here: V, $v = (v1, v2)$, n) and whose touching an input interface, here in FIG. 5a e.g. the screen area with numeric keypad of the screen page 100a, which allows the user to enter the value of the at least one first pipetting parameter, wherein the screen page 100 contains an input field 101, the touching of which causes the display, here in a separate screen page 110, in a selection list, which contains a list of short descriptions (here: "quick mix", "reverse", "step time", "auto blow off" etc.) of further pipetting parameters (here: "$v = (v1, v2, n)$", etc.))) of further selectable pipetting parameters (here qm, rev, st, abo etc.), from which the user can select at least one second pipetting parameter (here qm, rev, st, or abo etc.) which corresponds to the at least one second pipetting parameter (here qm, rev, st, or abo etc.)), which is added to the at least one first pipetting parameter of the base parameter set, in order to define with this the pipetting parameters of the parameter set of pipetting parameters determining the pipetting operation, wherein, after the selection of the at least one second pipetting parameter has been completed, the selection list is closed and the screen page 100 is displayed again, which now also displays, in addition to the at least one first input tile 103, at least one second input tile which displays the value of the at least one second pipetting parameter (in this case qm, rev, st, or abo etc.) and the touching of which triggers an input of at least one second pipetting parameter (in this case qm, rev, st, or abo etc.)) and the touching of which opens an input interface 100*d* etc. which allows the user to enter the value of the at least one second pipetting parameter.

As an alternative to the display of an alternative screen page 110 in which the selectable parameters are shown, from which one returns to the home screen 100 after selecting/deselecting the desired parameters by touching the input field 104, the contents of the home screen can also be, as shown in FIG. 3*b*, e.g. by a downwardly extended area 106 accessible by scrolling (vertical wiping or tapping on the control panel 105) or even further areas, in which the possible pipetting parameters are listed and can be selected/activated, and subsequently their values can also be edited.

Said invention provides a particularly advantageous aspect of the innovative operating concept of a pipetting device. From user studies it became known to the inventors that for a significant fraction of users a more efficient workflow can be produced with a pipetting device in which the user defines the desired pipetting operations mostly according to his own wishes by adding pipetting parameters, i.e. functions or features, to an existing, e.g. a proven parameter set or a base parameter set. This approach obviously leads optimally efficiently to the goal of defining an individually desired pipetting operation. In particular, if a base parameter set is provided on a screen, especially a home screen, which is immediately executable, a sense of achievement in operation is immediately provided without the need for lengthy study of operating instructions. Within a short learning time, users orient themselves in the list of possible pipetting parameters, and thus more efficiently exploit the potential of the great functionality of an electric pipetting device. This is especially true for the large group of users who, with known prior art pipetting devices, have difficulty learning existing—more or less complex—operating modes representing application scenarios, and then settle for the simplest operating modes. The novel concept invites inexperienced users to learn functions and offers full flexibility to experienced users.

Preferably, the data processing device 6 is programmed to, when the value for a pipetting parameter entered by a user via an input interface 100*a*, 100*b*, 100*c*, 100*d* is invalid, display an information on the screen and preferably at least one correction button is displayed, the touching of which, either instead of the value entered by the user; automatically performs at least one correction operation, which may have the following embodiments:

a permissible value is automatically set instead of the impermissible value;

at least one pipetting parameter alternative to the said pipetting parameter is selected and, in particular, occupied by the value of the user or another suitable value;

User's input is undone and, in particular, re-entry is enabled;

and/or an error message is output;

and/or the change of the previously current value is ignored and the previously current value is kept;

and/or another non-combinable pipetting parameter representing a non-combinable function is automatically deselected.

Preferably, the data processing device 6 is programmed to display on the screen 4 a screen page 100 displaying a list of input tiles 103*a*, 103*b*, 103*c*, in particular extending over substantially the entire screen page.

FIG. 4: The data processing device 6 is programmed to display in screen 4 a start screen 120 and which is replaced by a laterally opposite swipe gesture by a third screen page 130, wherein in particular (cf. FIG. 6) the second screen page 120 has a list of input fields, wherein each input field has a short designation (here e.g. the input tile with the short designation "measure volume") and wherein touching the input field loads a predetermined parameter set which defines a predetermined pipetting operation, wherein in particular after touching this input field a further screen page 120*a* is displayed; and wherein in particular the third screen page 130 has a list with input fields, wherein each input field has a short designation (here e.g. the input tile with the short designation "measure volume"). for example the input tile with the short designation "150 μl steps 6" etc.) and wherein the touching of the input field loads a historical, in the past used and automatically stored, parameter set which defines a historical pipetting operation, wherein in particular after touching this input field another screen page is displayed.

In FIG. 1*e* the system 300 for inputting pipetting parameters is shown, comprising the handheld pipetting device 1 an external data processing device 50 having an external screen 51 and a data processing device 52 programmed to display in the external screen an external input screen page for displaying and inputting the pipetting parameters of a parameter set of pipetting parameters, wherein the external input screen page and the input screen page of the pipetting device are substantially the same in content, the system being arranged to transfer the pipetting parameters defined on the external data processing device to the pipetting device and to use them there to define a pipetting operation.

FIG. 7*a* uses two images of an input screen page 100_3 of a pipetting device according to an embodiment example to show the functionality of the GUI of the pipetting device to mark a current parameter set as a favorite, which is then stored as a favorite and displayed in particular in a favorite screen page as a selectable list entry, namely as a correspondingly informative input tile. An input field correspondingly marked with a favorite symbol (asterisk) detects a user touch here, on the basis of which a pipetting parameter set defined in the input screen page 100_3 is stored as a favorite, which is illustrated by the color change of the favorite symbol.

FIG. 7*b* illustrates, based on two screen pages of a pipetting device according to an embodiment example, the functionality of the GUI of the pipetting device that the input tile identifying a favorite parameter set in the favorite page 121 has an input field, the touching of which transfers the parameters of the favorite parameter set to the home screen, namely the input screen page 100_4, which is then displayed, in which the parameter values and/or the parameter selection of the favorite parameter set can be changed.

FIGS. 8*a*, 8*b*, and 8*c* belong together and show, on the basis of a sequence of numerous images of the screen with an actuating element (symbolically) superimposed below it, the functionality of the GUI of a pipetting device according to an embodiment to define the pipetting parameters of a user-defined pipetting operation by a recorder function of the pipetting device. In FIG. 8*a*, a programming operation performed by the user starts from a screen page titled "Programs", which has already been described as an "auto-program set screen page". By means of an input field "+" on this screen page another program can be created. Then, here on a following screen page, an input field "record" is offered, whose touching starts the recorder function and/or the recording. As it were, a separate "recorder mode" of the pipetting device is started, in which, here in the example, the actuation of the actuating elements (9*a*, 9*b*) does not lead to the electrical movement of the piston 3; rather, a pipetting operation is only simulated (but this could also be carried out in a non-simulated manner), and the program steps are recorded. A feature of the recorder function is that only the actuating elements 9a, 9b, which serve to pick up and dispense the sample, as well as the touch screen and its input tiles 103, which serve to set pipetting parameter values, on input screen pages 100" etc. are necessary. No programming by means of programming code is required. During recording, a status bar in the screen shows the information that recording is in progress ("Recording . . . "). In addition, an input field with a stop character is provided, with which the recording can be stopped. The automatically assigned name "Program 2" is displayed in the program list of the "Programs" screen page as an input tile; touching it allows editing the program, especially changing its name.

The invention claimed is:

1. A hand-held pipetting device for pipetting at least one liquid sample, with a connecting section for connecting at least one pipetting container, having an electrically controlled moving member for aspirating the at least one sample into the at least one pipetting container, holding the sample in the at least one pipetting container, and dispensing the sample from the at least one pipetting container when performing a pipetting operation, with a touch-sensitive screen for entering the values of user-definable pipetting parameters, wherein a parameter set of at least one pipetting parameter defines a pipetting operation, with an electrical control device comprising a data processing device programmed to control the moving member in dependence on the at least one pipetting parameter of the parameter set, with at least one actuating element, whose actuation by the user starts the pipetting operation defined according to the parameter set, characterized in that the data processing device is programmed to display a graphical user interface (GUI) in the screen, the GUI including at least:

displaying of a screen page in the screen in which pipetting parameters of a parameter set of pipetting parameters are displayed, wherein the screen page includes at least a first input tile that displays the value of at least a first pipetting parameter of a base parameter set that defines a base pipetting operation, and touching the input tile opens an input interface that allows the user to enter the value of the at least a first pipetting parameter, wherein the screen page comprises at least one input field, the touching of which enables the selection of at least one second pipetting parameter by the user, wherein the data processing device is programmed to, after detection of said user-activated selection, determine that said at least one second pipetting parameter is added to said at least one first pipetting parameter of said base parameter set to form with said at least one first pipetting parameter the pipetting parameters of a user parameter set defining a user defined pipetting operation, and this selection of the at least one second pipetting parameter is displayed to the user in the screen page, wherein, after completion of the selection, the selection list is closed and the screen page is displayed again and now also displays, in addition to the at least one first input tile, at least one second input tile that displays the selected second pipetting parameter or a value thereof; and touching the at least one second input tile opens an input interface that allows the user to enter the value of the at least one second pipetting parameter.

2. The hand-held pipetting device according to claim 1, wherein an input field is provided in the screen page, the touching of which causes the display of a predetermined selection set of available pipetting parameters in the form of a selection list in a new screen page or an input area superimposed on the screen page, which contains information about selectable second pipetting parameters from which the user can select the at least one second pipetting parameter.

3. The hand-held pipetting device according to claim 1, wherein a set N>=1 of input fields including input tiles, is displayed on the screen page as a scrollable list of input tiles, each input field being assigned and displayed information about a second pipetting parameter selectable by the input field, wherein, after the user-activated selection of the at least one second pipetting parameter from the set N of input fields, the selection and/or a value of the at least one second pipetting parameter is displayed, wherein, in the case where the at least one second pipetting parameter can assume a user-selectable value, touching the at least one second input tile allows the user to enter the value of the at least one second pipetting parameter.

4. The hand-held pipetting device according to claim 1, wherein the data processing device is programmed to, display in the screen a screen page including at least one first input tile displaying the value of at least one first pipetting parameter and touching which opens an input interface allowing the user to enter the value of the at least one first pipetting parameter, wherein said input interface is a screen area in which a numeric keypad is displayed, the numeric keys of which are individually touchable and usable by the user to enter a sequence of digits defining the value of the at least one first pipetting parameter.

5. The hand-held pipetting device according to claim 1, wherein the data processing device is programmed to, if the value entered by a user via an input interface for a pipetting parameter is invalid, information is displayed on the screen and at least one correction button is displayed, the touching of which, either instead of the value entered by the user, automatically performs at least one correction operation, which may have the following embodiments:

instead of the invalid value, a valid value is automatically set;

at least one pipetting parameter alternative to the said pipetting parameter is selected and is occupied by the value of the user or another suitable value;

it will undo the user's input and allow it to be re-entered;

or an error message is output;

or the change of the previously current value is ignored and the previously current value is kept;

or another non-combinable pipetting parameter representing a non-combinable function is automatically deselected.

6. The hand-held pipetting device according to claim 1, wherein the data processing device is programmed to, display in the screen a screen page showing a list of input tiles extending substantially over the entire width of the screen page.

7. The hand-held pipetting device according to claim 1, wherein the data processing device is programmed to, display in the screen a start screen page, which is the screen page for displaying the pipetting parameters of a parameter set of pipetting parameters, and which is replaced by a sideways swipe gesture by a second screen page and which is replaced by a sideways opposite swipe gesture by a third screen page, wherein the second screen page comprises a list of input fields, wherein each input field comprises a short designation and wherein touching the input field loads a predetermined parameter set defining a predetermined pipetting operation, wherein after touching this input field the start screen page with the input tiles of the predetermined parameter set is displayed again; and wherein the third screen page comprises a list of input fields, wherein each input field comprises a short designation and wherein touching the input field loads a historical parameter set, used in the past and automatically stored, which defines a historical pipetting operation, wherein after touching this input field the start screen page with the input tiles of the historical parameter set is displayed again.

8. The hand-held pipetting device according to claim 1, wherein the data processing device is programmed to display in the screen an input screen page for displaying and inputting pipetting parameters of a parameter set of pipetting parameters, and, when the actuation of said at least one actuating element is detected, displaying in said screen, instead of said input screen page, an output screen page for displaying pipetting parameters of said parameter set defined in said input screen page, and, when said actuation of said at least one actuating element is detected or upon subsequent actuation of one of said actuating elements, to start the pipetting operation defined according to said pipetting parameter set, wherein said or a subsequently displayed output screen page comprises a special button, touching of which causes the output screen page to be closed and said input screen page or another input screen page to be displayed on the screen.

9. The hand-held pipetting device according to claim 1, wherein the data processing device is programmed to execute a recorder function, in which the GUI has at least one input field for starting and/or ending a recording and, after the start, the steps of a pipetting program for carrying out a pipetting operation defined by the user are recorded, the user carrying out these steps by means of actuating the at least one actuating element and by means of inputs of values of the pipetting parameters in one or more input screen pages.

10. The hand-held pipetting device according to claim 1, wherein the pipetting device comprises an operating rocker, and comprises a first and a second actuating element which can be actuated separately from one another by the operating rocker, in that pressing a first pressure surface of the operating rocker actuates the first actuating element and pressing a second pressure surface of the operating rocker actuates the second actuating element, the first and second pressure surfaces being haptically distinguishable.

11. The hand-held pipetting device according to claim 1, wherein the pipetting device comprises a housing which is arranged as a handle for holding the pipetting device with a single hand of the user and which comprises an axial portion containing the piston, along the longitudinal axis of which the piston extends, and wherein the pipetting device comprises a first and a second actuating element which are separately actuable by an operating rocker which is mounted on a thumb support surface arranged at an angle 80<a<180° to the longitudinal axis and inclined downwardly.

12. The hand-held pipetting device according to claim 1, wherein the pipetting device comprises a housing having an axial portion containing the plunger, along the longitudinal axis of which the plunger extends, and a head portion having a front surface inclined to the longitudinal axis, formed by the surface of the screen and a frame enclosing it, the screen occupying at least 80% of the front surface; and wherein a frame front surface lies in a first plane and the screen lies in a second plane identical to or parallel to the first plane.

13. The hand-held pipetting device according to claim 1, comprising a housing with a connecting section for at least one pipetting container and with an ejector button, the contact surface of which can be moved along a path into the housing by pressing the ejector button, the pipetting device being set up such that, when the end of this path is reached, the ejection of a pipetting container from the connecting section takes place or an electrical signal is generated which triggers the ejection of the at least one pipetting container.

14. A system for inputting of pipetting parameters, comprising the hand-held pipetting device according to claim 1, and an external data processing device comprising an external screen and data processing device programmed to display in the external screen an external input screen page ("set") for displaying and inputting the pipetting parameters of a parameter set of pipetting parameters, wherein the external input screen page and the input screen page of the pipetting device are substantially the same in content, wherein the system is configured to transmit the pipetting parameters defined on the external data processing device to the pipetting device and to use them there to define a pipetting operation.

15. A computer program code for providing an input screen page on the screen of a hand-held pipetting device used for pipetting at least one liquid sample and comprising a connecting section for connecting at least one pipetting container, an electrically controlled moving member for aspirating the at least one sample into the at least one pipetting container, for holding the sample in the at least one pipetting container, and for dispensing sample from the at least one pipetting container when performing a pipetting operation, and a touch-sensitive screen for inputting the parameter values of user-definable pipetting parameters, wherein a parameter set of pipetting parameters completely defines the pipe tting operation, and wherein the pipetting device comprises an electrical control device with a data processing device which is programmed to control the moving member as a function of the at least one pipetting parameter, and at least one actuating element which can be actuated by a finger pressure of a user and whose actuation starts the pipetting operation defined according to the parameter set, wherein the program code, when executed by the data processing device of the hand-held pipetting device, results in a) a screen page for displaying the pipetting parameters of a parameter set of pipetting parameters is displayed in the screen, b) the screen page includes at least one first input tile that displays the value of at least one first pipetting parameter of a base parameter set that defines a base pipetting operation, and touching the input tile opens an input interface that allows the user to enter the value of the at least one first pipetting parameter c) the screen page comprises at least one input field, the touching of which enables the selection of at least one second pipetting parameter by the user, the data processing device being programmed, after detection of this user-activated selection, to cause the at least one second pipetting parameter to be added to the at least one first pipetting parameter of the base parameter set to form with said at least one first pipetting parameter the pipetting parameters of a user parameter set defining a user defined pipetting operation, and displaying said selection of said at least one second pipetting parameter to the user in the screen page; wherein after completion of the selection, the selection list is closed and the screen page is displayed again and now also displays, in addition to the at least one first input tile, at least one second input tile which displays the selected second pipetting parameter or a value thereof, and touching the at least one second input tile opens an input interface which allows the user to enter the value of the at least one second pipetting parameter.

* * * * *